US009202112B1

(12) United States Patent
Ueta et al.

(10) Patent No.: US 9,202,112 B1

(45) Date of Patent: Dec. 1, 2015

(54) MONITORING DEVICE, MONITORING SYSTEM, AND MONITORING METHOD

(71) Applicant: PANASONIC INTELLECTUAL PROPERTY MANAGEMENT CO., LTD., Osaka (JP)

(72) Inventors: Daisuke Ueta, Tokyo (JP); Yuichi Matsumoto, Kanagawa (JP); Kazuma Yoshida, Saitama (JP)

(73) Assignee: PANASONIC INTELLECTUAL PROPERTY MANGEMENT CO., LTD., Osaka (JP)

( * ) Notice: Subject to any disclaimer, the term of this patent is extended or adjusted under 35 U.S.C. 154(b) by 0 days.

(21) Appl. No.: 14/717,198

(22) Filed: May 20, 2015

(30) Foreign Application Priority Data

May 23, 2014 (JP) ................................ 2014-106705

(51) Int. Cl.

| | |
|---|---|
| ***G06K 9/00*** | (2006.01) |
| ***G06K 9/74*** | (2006.01) |
| ***H04N 5/272*** | (2006.01) |
| ***H04N 7/18*** | (2006.01) |

(52) U.S. Cl.

CPC ........ *G06K 9/00342* (2013.01); *G06K 9/00369* (2013.01); *G06K 9/00778* (2013.01); *G06K 9/74* (2013.01); *H04N 5/272* (2013.01); *H04N 7/181* (2013.01); *G06K 2207/1012* (2013.01); *H04N 2005/2726* (2013.01)

(58) Field of Classification Search

CPC .......... H04N 5/23216; H04N 5/23293; H04N 7/183; H04N 7/18; G06K 9/00771; G06Q 30/02; G06T 11/60

See application file for complete search history.

(56) References Cited

U.S. PATENT DOCUMENTS

| | | | | |
|---|---|---|---|---|
| 6,400,830 | B1 * | 6/2002 | Christian | G06T 7/20 348/155 |
| 6,567,116 | B1 * | 5/2003 | Aman | A63B 24/0021 348/164 |
| 2008/0181453 | A1 * | 7/2008 | Xu | G06T 7/2006 382/103 |
| 2011/0187703 | A1 * | 8/2011 | Patwardhan | G06K 9/00 345/419 |
| 2013/0027561 | A1 | 1/2013 | Lee et al. | |
| 2013/0030875 | A1 | 1/2013 | Lee et al. | |

(Continued)

FOREIGN PATENT DOCUMENTS

| | | |
|---|---|---|
| JP | 5159381 B | 3/2013 |
| JP | 2013-186838 A | 9/2013 |

OTHER PUBLICATIONS

U.S. Appl. No. 14/613,612 to Hirofumi Fujii et al., filed Feb. 4, 2015.

(Continued)

*Primary Examiner* — Tom Y Lu

(74) *Attorney, Agent, or Firm* — Greenblum & Bernstein, P.L.C.

(57) ABSTRACT

A monitoring device is provided with a person image analyzer which has a person detector which detects a person from captured moving images and acquires positional information which relates to a person area, and an area state determinator which determines an area state which indicates the state of people in the person area based on the positional information, a mask image setter which sets the mask image which corresponds to the area state, and a moving image output controller which generates and outputs output moving images where the person area is changed to the mask image which corresponds to the area state based on the positional information and the area state which are output from the person image analyzer.

9 Claims, 19 Drawing Sheets

STORE
1 CAMERA
1 CAMERA
1 CAMERA
RECORDER 2
PC 3
MONITOR 4
STORE
1 CAMERA
1 CAMERA
1 CAMERA
RECORDER 2
PC 3
MONITOR 4
HEAD OFFICE
PC 11
MONITOR 12
CLOUD COMPUTER 21
SMARTPHONE 22
TABLET TERMINAL 23

(56) References Cited

U.S. PATENT DOCUMENTS

2013/0287250 A1* 10/2013 Lee .................... G06K 9/00362 382/103
2015/0187088 A1 7/2015 Iwai et al.

OTHER PUBLICATIONS

U.S. Appl. No. 14/666,766 to Yuichi Matsumoto et al., filed Mar. 24, 2015.

* cited by examiner

HEAD OFFICE
PC
11
MONITOR
12
CLOUD COMPUTER
21
SMARTPHONE
22
TABLET TERMINAL
23
STORE
RECORDER
2
PC
3
MONITOR
4
CAMERA
1
STORE
RECORDER
2
PC
3
MONITOR
4
CAMERA
1

| AREA STATE | MASK IMAGE |
|---|---|
| GROUP | |
| STANDALONE | |

STANDALONE ENHANCED DISPLAY

SALES FLOOR MONITORING
2013/07/01 15:54
DATE AND TIME SETTINGS
AREA STATE
ATTRIBUTE
MASK IMAGE
GROUP
STANDALONE
MALE
FEMALE
MALE
FEMALE
4:00
9:00
14:00
19:00
0:00
OO
START
SET
SALES FLOOR MONITORING
GOODS MONITORING
DISPLAY ALERT
SHORTAGE ALERT
...
...
41
42
43
44
45
46
47
48
49
50
51

| AREA STATE | ATTRIBUTE | MASK IMAGE |
|---|---|---|
| GROUP | MALE | |
| | FEMALE | |
| STANDALONE | MALE | |
| | FEMALE | |

| AREA STATE | MASK IMAGE |
|---|---|
| GROUP | |
| STANDALONE | |

| AREA STATE | MASK IMAGE |
|---|---|
| GROUP | |
| STANDALONE | |

| AREA STATE | MASK IMAGE |
| --- | --- |
| MOVING | |
| STATIONARY | |

| AREA STATE | MASK IMAGE |
|---|---|
| MOVING TO BACK | |
| MOVING TO FRONT | |
| STATIONARY | |

MONITORING DEVICE, MONITORING SYSTEM, AND MONITORING METHOD

BACKGROUND OF THE INVENTION

1. Field of the Invention

The present invention relates to a monitoring device, a monitoring system, and a monitoring method where output moving images, where a person area which is detected from captured moving images in a monitoring area is changed to a mask image, are generated and output.

2. Description of the Related Art

In a store such as a convenience store, a monitoring system where cameras which capture the inside of the store are installed and people inside the store are monitored using moving images from the cameras has become widespread, but in a case where captured moving images are used with an object other than the object of monitoring, that is, marketing analysis or service improvement, it is necessary to protect customer privacy.

With respect to the demand to protect customer privacy, in the related art a technique is known where a person area in a moving image which is captured using a camera is changed to a specific mask image and displayed (refer to Japanese Patent Unexamined Publication No. 2013-186838 and Japanese Patent No. 5159381). In particular, in the technique which is disclosed in Japanese Patent Unexamined Publication No. 2013-186838, it is easy to ascertain physical movement of people by displaying characteristic points on the mask image. In the technique which is disclosed in Japanese Patent No. 5159381, it is easy to ascertain the behavior of people with respect to the background by setting the transparency of the mask image.

Regarding ascertaining behavior of people from moving images, people are viewed while distinguishing people from the background, but in the manner of techniques in the related art, an advantage is obtainable where it becomes easy to ascertain behavior of a person since when setting such that a person area is changed to a specific mask image and displayed, since it is possible to easily identify the background and people in addition to protecting customer privacy.

However, in a state where a plurality of people overlap when viewed from a camera, a person area which is detected from moving images is configured by a plurality of people, that is, a state is detected where the image area of the plurality of people is continuous, in such a case, there is a problem in that just from viewing the mask image it is not possible to simply determine the state of people from the mask image without being certain whether there is only one person or if there is a plurality of people, and in particular, there is a problem in that a burden on a user becomes large in a case where the moving images span a long period of time, and a technique is desired where it is possible to effectively perform work where the behavior of people is ascertained.

SUMMARY OF THE INVENTION

A monitoring device according to an embodiment of the present invention generates and outputs output moving images where a person area which is detected from captured moving images in a monitoring area is changed to a mask image. The monitoring device is provided with a person image analyzer which has a person detector which detects a person from the captured moving images and acquires positional information which relates to the person area, and an area state determinator which determines an area state which indicates the state of people in the person area based on the positional information, a mask image setter which sets the mask image which corresponds to the area state, and a moving image output controller which generates and outputs output moving images where the person area is changed to the mask image which corresponds to the area state based on the positional information and the area state which are output from the person image analyzer.

DETAILED DESCRIPTION OF THE PREFERRED EMBODIMENTS

Figure 1:
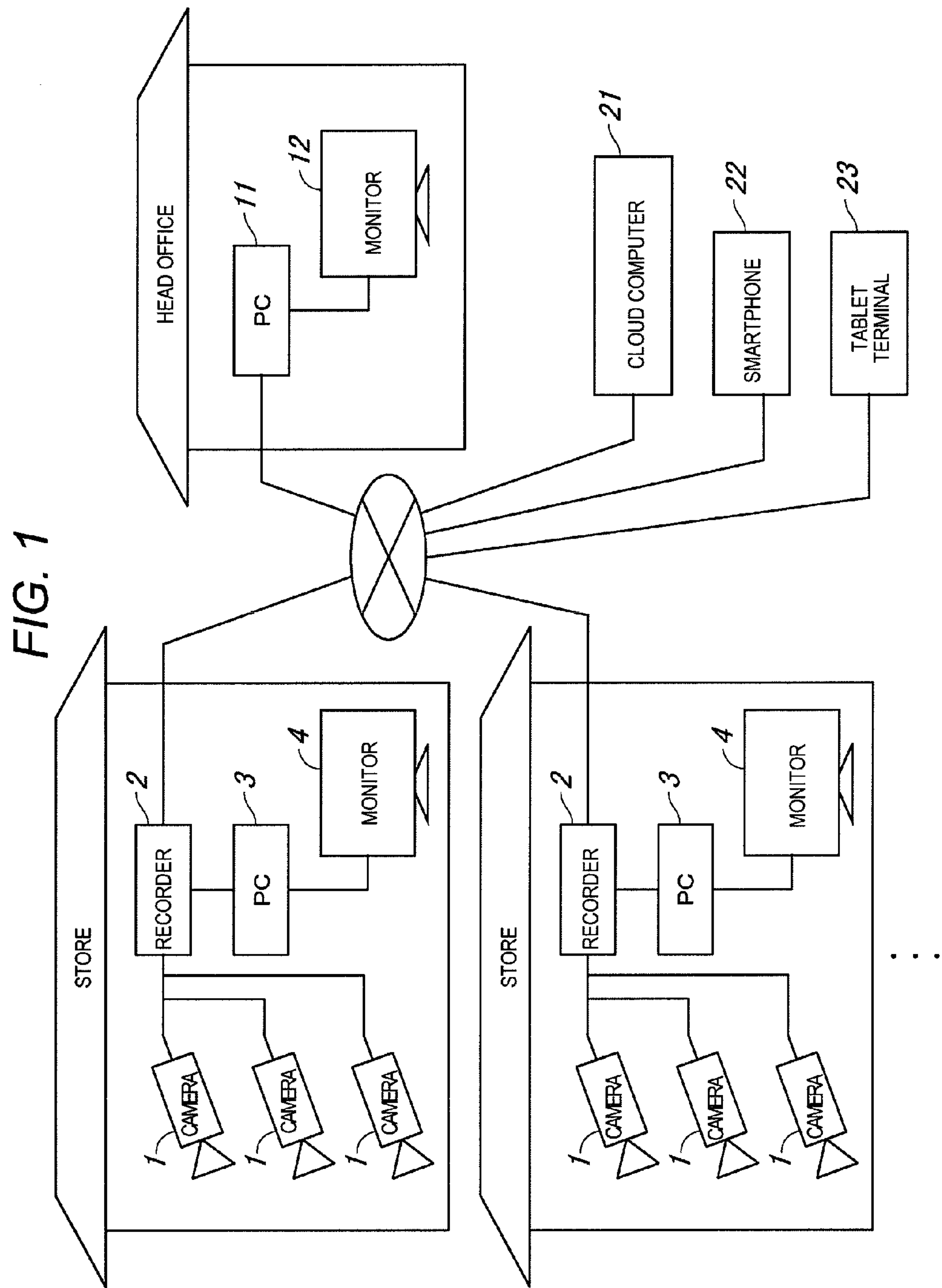
FIG. 1 is a configuration diagram of the entirety of a monitoring system according to a first embodiment.

The present invention is proposed to alleviate a problem of such techniques in the related art, and the main advantage of the invention is to provide a monitoring device, a monitoring system, and a monitoring method configured such that it is possible for a user to effectively perform work where the behavior of people is ascertained from moving images in a monitoring area and it is possible to reduce a burden on the user in a case where moving images span a long period of time.

A first invention is a monitoring device which generates and outputs output moving images, where person areas which are detected from captured moving images in a monitoring area are changed to mask images, wherein the monitoring device is configured so as to be provided with a person image analyzer which has a person detector which detects people from the captured moving images and acquires positional information which relates to the person areas, and an area state determinator which determines the area states which show the state of people in the person area based on the positional information, a mask image setter which sets the mask image which corresponds to the area state, and a moving image output controller which generates and outputs output moving images where person areas are changed to the mask images which correspond to the area state based on the positional information and the area state which are output from the person image analyzer.

Thereby, a mask image which corresponds to the area state which indicates the state of people in the person area is displayed, and since it is possible simply ascertain the state of people in the person area using the mask images, it is possible for a user to effectively perform work where the behavior of people is ascertained from moving images and it is possible to reduce the burden on the user in a case where moving images span a long period of time.

A second invention is configured such that the area state is classified according to the number of people that configures the person area.

Thereby, since it is possible to ascertain the number of people that configure the person area using the mask images which are displayed in separate area states, it is possible to further effectively perform work where the behavior of people is ascertained from moving images.

A third invention is configured such that the area state determinator determines either group which is configured by a plurality of people or standalone which is configured by one person as the area state.

Thereby, the standalone mask image has a person area which is configured by one person and the shape of the person is formed, therefore, since it is easy to ascertain the state and movement of the person, it is possible to monitor behavior of the person in detail by observing the standalone mask image. Since the group mask image becomes a person area which is configured by a plurality of people and the shapes of all of the people are not formed, it becomes difficult to ascertain the state and movement of the people, but it is possible to ascertain an area where the people gather in the monitoring area by observing the group mask image, for example, in a store it is possible to ascertain an area where there is a great deal of customer focus on expensive goods.

A fourth invention is configured such that the mask image setter sets the mask image which corresponds to the area state according to an input operation by a user who selects the mask image which corresponds to the area state.

Thereby, since a user is able to freely set the mask image, it is possible to improve user convenience. Since it is possible to enhance display of a mask image in an area state which is observed according to the application by setting the mask image as appropriate, it is possible for a user to effectively perform work where the behavior of people or the state of the monitoring area is ascertained.

A fifth invention is configured such that the person image analyzer further has an attribute determinator which determines attributes of the person area, the mask image setter sets the mask image which corresponds to the area state and the attributes, and the moving image output controller generates and outputs output moving images, where the person areas are changed to the mask images which correspond to the area state and the attributes.

Thereby, mask images with separate attributes are displayed, therefore, since it is possible to simply ascertain the attributes of the person areas using the mask images, it is possible for a user to effectively perform work where the behavior of people is ascertained for each attribute.

A sixth invention is configured such that the mask image enables the area state to be identified by changing the display element of at least one of color, shade, pattern, and contour lines according to the area state.

Thereby, it is possible to easily identify the area state of the person area using a difference in the mask image.

A seventh invention is configured so as to be further provided with a background image generator which generates a background image from the captured moving images, wherein the moving image output controller generates the output moving images where the mask image which has transparency is superimposed on the background image.

Thereby, the mask image has transparency, therefore, since the background image appears transparent, it is possible to monitor the behavior of people while viewing the circumstances of the monitoring area in which the background image is photographed.

An eighth invention is configured such that a monitoring system in which output moving images, where a person area which is detected from captured moving images in a monitoring area is changed to a mask image, are generated and output, wherein the monitoring system is provided with a person image analyzer which has a person detector which has cameras which capture a monitoring area and a plurality of information processing devices, and where at least one of the plurality of information processing devices acquires positional information which relates to the person area by detecting people from background moving images using the cameras, and an area state determinator which determines the area state which indicates the state of people in the person area based on the positional information, a mask image setter which sets the mask image which corresponds to the area state, and a moving image output controller which generates and outputs the output moving images where the person area is changed to the mask image which corresponds to the area state based on the positional information and the area state which are output from the person image analyzer.

Thereby, in the same manner as the first invention it is possible for a user to effectively perform work where the behavior of people is ascertained from moving images in a monitoring area and it is possible to reduce the burden on the user in a case where moving images span a long period of time.

A ninth invention is configured such that a monitoring method which causes a process where output moving images, where a person area which is detected from captured moving images in a monitoring area is changed to a mask image, are generated and output to be carried out in an information processing device, where the monitoring method has a step in which a process where a person is detected from the captured moving images and positional information which is related to the person area is acquired and a process where an area state which indicates the state of people in the person area is determined based on the positional information are executed, a step where the mask image which corresponds to the area state is set, and a step where output moving images, where the person area is changed to a mask image which corresponds to the area state, are generated and output based on the positional information and the area state.

Thereby, in the same manner as the first invention it is possible for a user to effectively perform work where the behavior of people is ascertained from moving images in a monitoring area and it is possible to reduce the burden on the user in a case where moving images span a long period of time.

Embodiments of the invention will be described below with reference to the drawings.

First Exemplary Embodiment

FIG. 1 is a configuration diagram of the entirety of a monitoring system according to a first embodiment; The monitoring system is an assembly which targets retail chain-stores such as convenience stores, and is provided with camera 1, a plurality of which are provided in each store, recorder (moving image storage device) 2, PC (a monitoring device) 3, and monitor (display device) 4, and PC 11 and monitor 12 which are provided in the general head office of the plurality of stores.

Camera 1 is installed at appropriate locations inside the store, the inside of the store (the monitoring area) is captured by camera 1, and the moving images obtained thereby are recorded on recorder 2. On PC 3 which is provided in the store and PC 11 which is provided in the head office, it is possible to access the moving images inside the store, which are captured by camera 1, in real time, in addition, it is possible to access moving images inside the store from the past which are recorded in recorder 2, and thereby it is possible to confirm the circumstances inside the store at the store or the head office.

PC 3 which is installed in the store is configured as a monitoring device which monitors the state of people and goods inside the store, it is possible to access monitoring information which is generated in PC 3 on PC 3 itself, furthermore the monitoring information is transmitted to PC 11 which is installed in the head office and can also be accessed on PC 11, and PC 3 and PC 11 are configured as access devices which access monitoring information.

Figure 2:
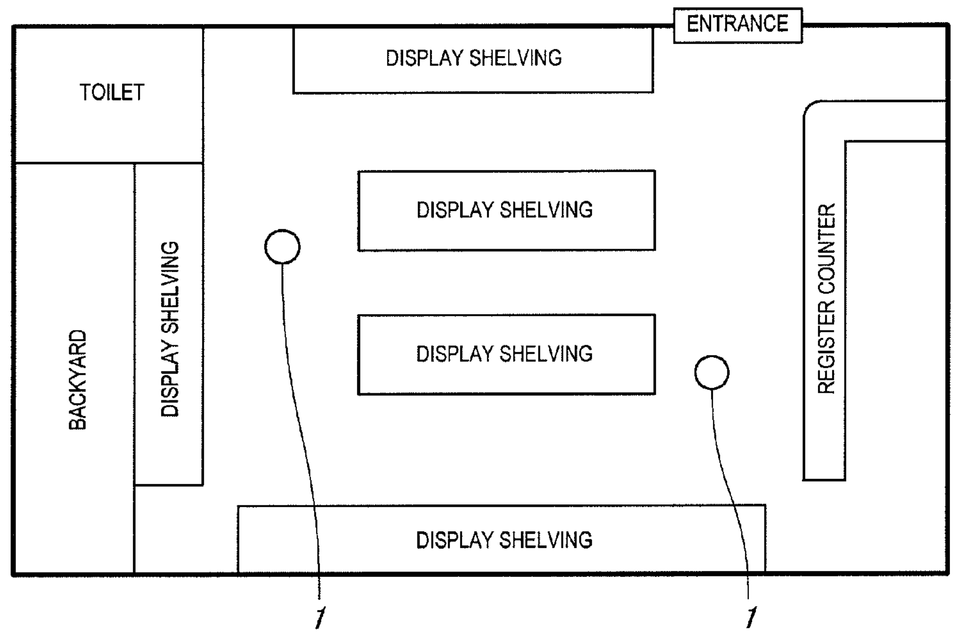
FIG. 2 is a planar diagram of a store which illustrates a store layout and installation circumstances of camera.

A store layout and installation circumstances of camera 1 will be described below using a convenience store as an example. FIG. 2 is a planar diagram of a store which illustrates a store layout and installation circumstances of camera 1.

An entrance/exit, display shelving, a register counter, and the like are provided in the store. The display shelving is installed so as to be divided into various goods such as lunches, bottled soft drinks, and rice balls. A customer enters the store through the entrance/exit, moves inside the store passing along aisles between the display shelving, and when the customer finds desired goods, picks up and brings the goods to the register counter, and after settlement (payment) is completed leaves the store through the entrance/exit.

The plurality of camera 1 which capture the inside of the store (the monitoring area) are provided in the store. The cameras are installed at appropriate positions on the ceiling inside the store. In particular, in the example shown in FIG. 2, an omnidirectional camera which has a 360 degree capturing range using a fish-eye lens is adopted as camera 1, and using camera 1 it is possible to capture people who enter and exit the store through the entrance/exit and people who stay inside the store.

Figure 3:
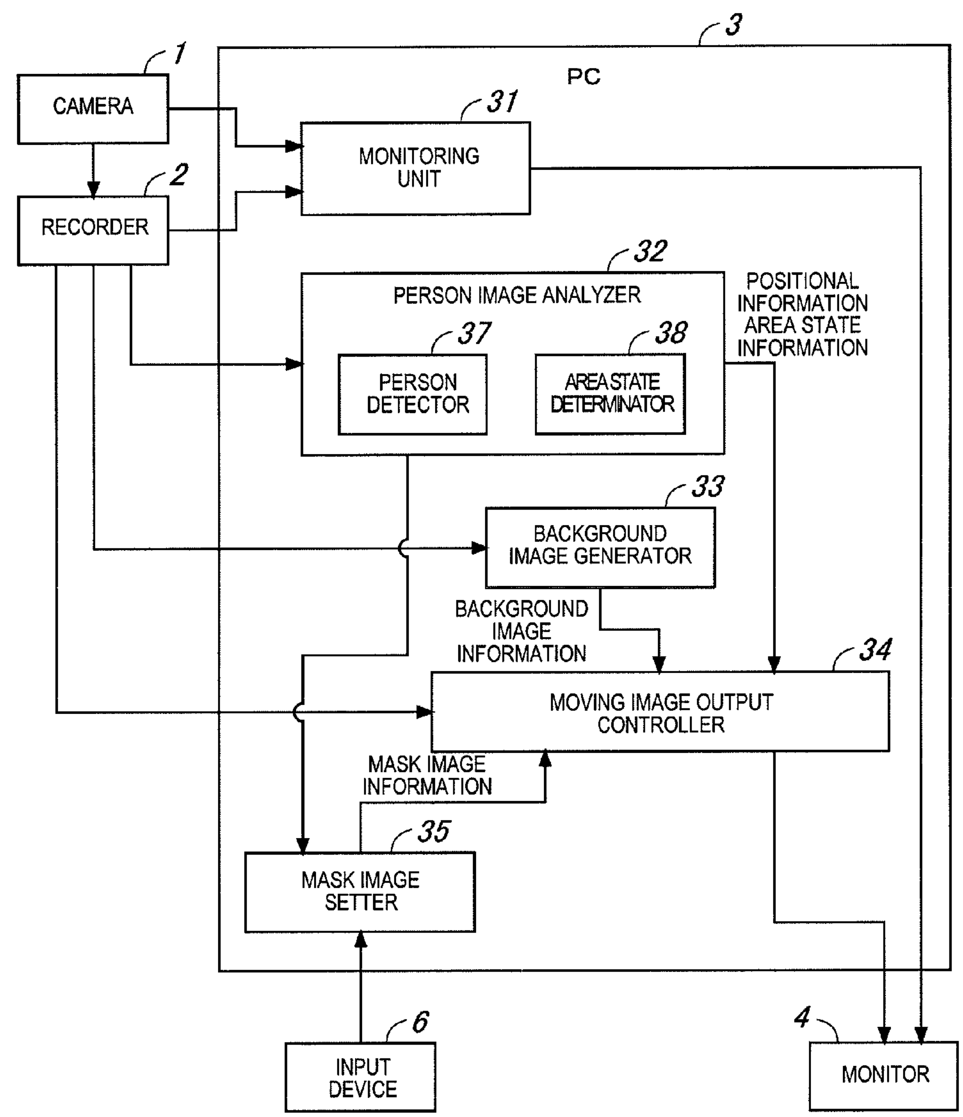
FIG. 3 is a functional block diagram illustrating a schematic configuration of a PC.

Processing performed by PC 3 which is shown in FIG. 1 will be described below based on a functional block diagram. FIG. 3 is a functional block diagram illustrating a schematic configuration of PC 3.

PC 3 is provided with monitoring unit 31. Monitoring unit 31 is caused to function as a monitoring system where PC 3 monitors the inside of the store, monitoring unit 31 controls the operation of camera 1 and recorder 2, moving images of the inside of the store which are captured using camera 1 are accessed in real time, and it is possible to access moving images of the inside of the store which are recorded in recorder 2.

PC 3 is provided with person image analyzer 32, background image generator 33, moving image output controller 34, and mask image setter 35.

Person image analyzer 32 analyses the moving images captured by camera 1 and acquires information which relates to the people who are imaged in the captured moving images, and is provided with person detector 37 and area state determinator 38.

In person detector 37, a process is performed where people are detected from the captured moving images and positional information which relates to the person area is acquired. The process which is performed in person detector 37 may use a known image recognition technique.

In area state determinator 38, a process is performed where the area state which indicates the state of people in the person area is determined based on the positional information which is acquired by person detector 37.

In the present embodiment, as the area state, it is determined whether a person area is either group which is configured by a plurality of people or the person area is standalone which is configured by one person.

In mask image setter 35 a process is performed where a mask image of a separate area state is set. In the present embodiment, a process is performed where the mask image of the separate area state is set according to an input operation of a user who selects the mask image in each area state. The mask image of the separate area state may be set in advance.

In background image generator 33, a process is performed where a background image is generated from the captured moving images. The background image is an image where an image of people (a foreground image) is removed from the captured moving images, each image of people from the plurality of moving images which were captured most recently is removed, such that background images from the plurality of images may be combined. Where there are no people present in the captured moving images, for example before the store is open, the captured moving images may be prepared in advance as the background image.

In moving image output controller 34, a process is performed where output moving images where person areas are changed to mask images with the separate area states are generated and output based on the positional information and the area state of each person which is output from person image analyzer 32. In the present embodiment, a process is performed where a mask image which has a contour that corresponds to the person area inside the captured moving images is generated, and this mask image is superimposed on the background image which is generated by background image generator 33.

The mask image enables identification of the area state by changing the display element of at least one of color, shade, pattern, and contour lines according to the area state, and in particular in the present embodiment contour lines are generated in the person area from positional information of each person (positional information of the person area), and the inner section of the contour lines are covered by the transparent image. The contour lines may not be displayed, or the contour lines may be displayed so as to be identifiable from the covered area by means of the color, the shade or the like being changed.

PC 3 which is shown in FIG. 3 has a processor (CPU) and a program memory. Each section of PC 3 is realized by executing the program for monitoring (instruction) using CPU of PC 3. The program may be recorded on an appropriate program recording medium as an application program which operates on a general purpose OS rather than being configured as a dedicated device which is installed in advance in PC 3 as an information processing device, or the program may be provided to the user via a network.

Figure 4:
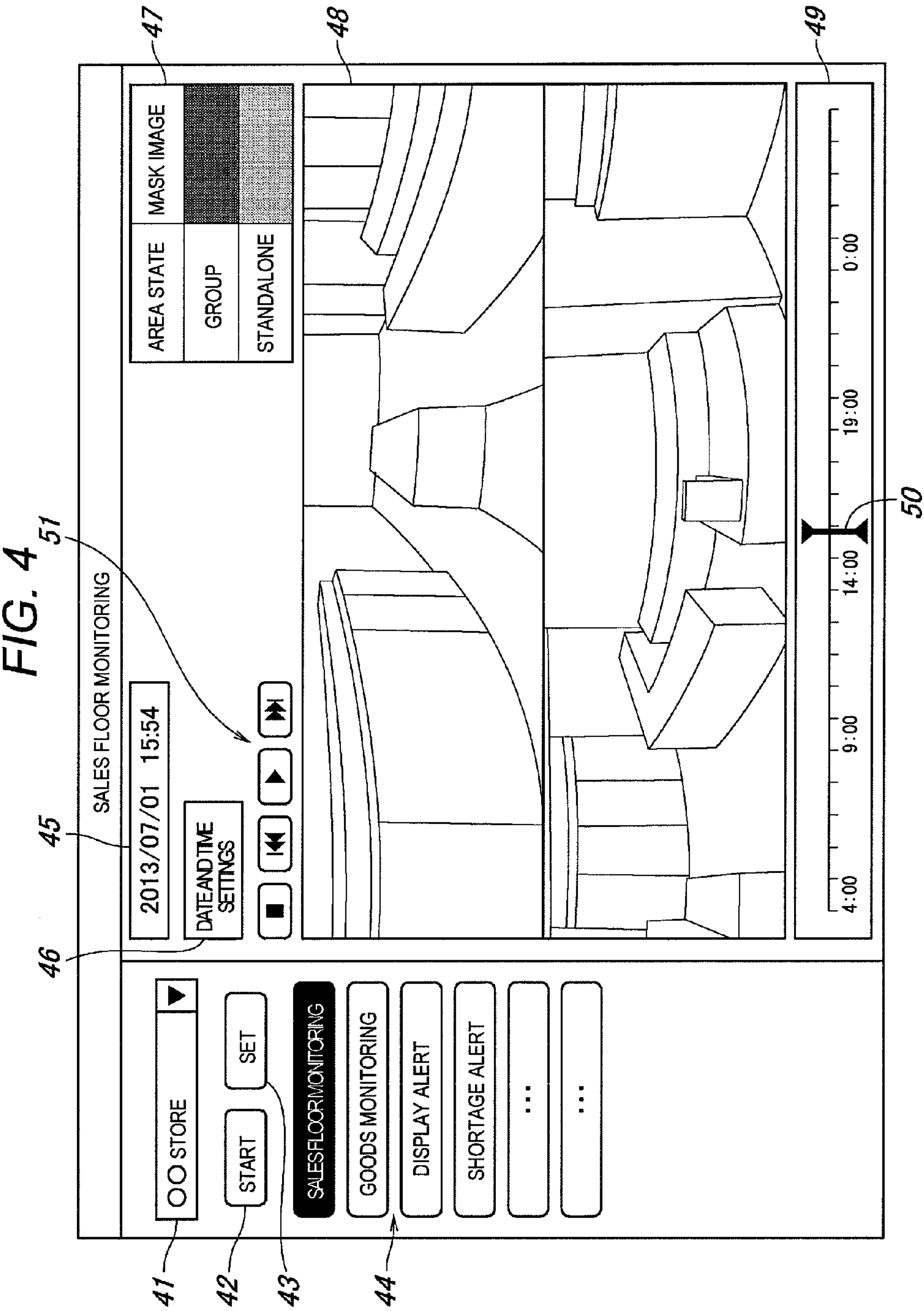
FIG. 4 is an explanatory diagram illustrating a monitoring screen which is displayed on a monitor.

A monitoring screen which is displayed on monitor 4 shown in FIG. 3 will be described below. FIG. 4 is an explanatory diagram illustrating the monitoring screen which is displayed on monitor 4.

The monitoring screen allows a user to confirm the circumstances inside the store with an object such as marketing analysis or service improvement, and the monitoring screen is provided with store selection unit 41, start button 42, settings button 43, operation mode selection unit 44, date and time display unit 45, date and time settings button 46, legend display unit 47, moving image display unit 48, and display time operation unit 49. In store selection unit 41, the user selects the store using the pull-down menu. Start button 42 causes a monitoring process to start in PC 3. Settings button 43 sets various conditions by means of the monitoring process, in the present embodiment, when settings button 43 is operated, the mask image settings screen (refer to FIG. 5) is displayed by pop-up. Operation mode selection unit 44 selects an operation mode, an operation mode is prepared such as sales floor monitoring, goods monitoring, display alerts, and shortage alerts, here sales floor monitoring is selected.

Date and time display unit 45 displays date and time. Date and time settings button 46 is for setting the date and time. When date and time settings button 46 is operated, a date and time settings screen which is not shown in the drawings is displayed, the selected date and time is displayed on date and time display unit 45 by selecting the date and time, or moving images of the selected date and time are displayed on moving image display unit 48.

Legend display unit 47 explains the mask images which are displayed on moving image display unit 48. In the present embodiment, the mask image which is set in each area state (group and standalone) is displayed on legend display unit 47.

Output moving images (moving pictures) which are generated by moving image output controller 34 are displayed on moving image display unit 48. In particular, in the example shown in FIG. 4, two moving images, where moving images that are captured by camera 1 which are omnidirectional cameras are panoramically developed, are displayed. The entirety of the store is imaged in the two moving images, and it is possible to confirm the circumstances of the entirety of the store. In a normal playback mode, the moving images captured by camera 1 are displayed without change on moving image display unit 48, in the mask playback mode, moving images where the person area is changed to the mask image are displayed. Moving images which are displayed on moving image display unit 48 will be explained in detail later.

Display time operation unit 49 adjusts the time in the moving images which are displayed on moving image display unit 48. It is possible to switch the moving image to a moving image with the desired time by operating display time operation unit 49. When slider 50 shifts using input device 6 such as a mouse, moving images with a time which is indicated by slider 50 are displayed on moving image display unit 48. Due to this, it is possible to confirm the circumstances of the store in the required time using the moving images of moving image display unit 48.

When the moving images of moving image display unit 48 are played back, operation button 51 may be operated, due to operation button 51, in addition to normal playback, fast forward playback and rewind playback are possible, and due to this it is possible to effectively confirm the moving images even during playback of moving images which span a long period of time in the mask playback mode.

Figure 5:
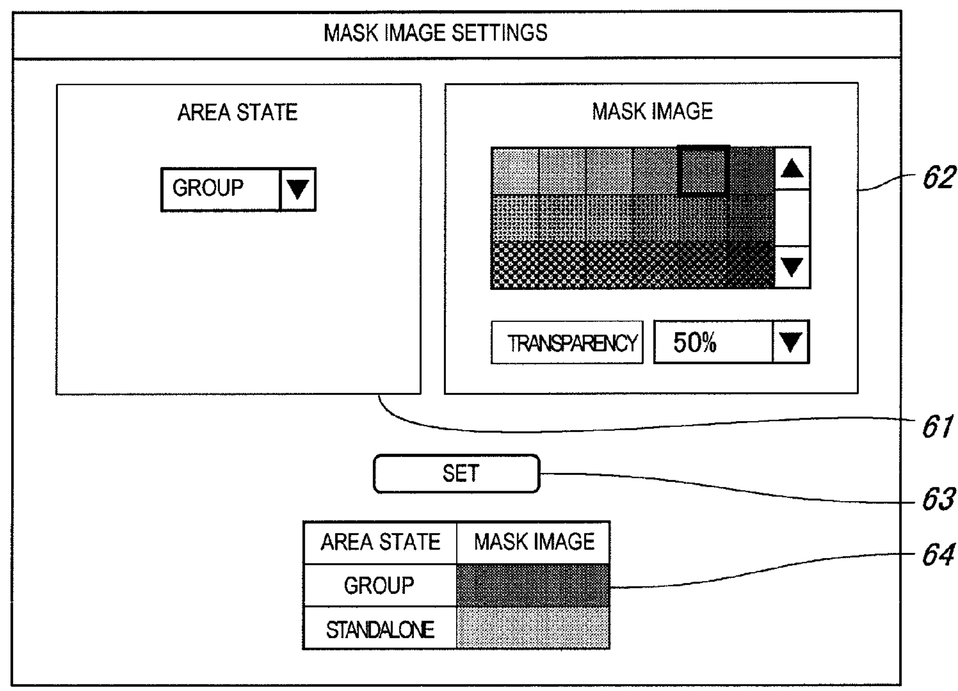
FIG. 5 is an explanatory diagram illustrating a mask image settings screen which is displayed on the monitor.

An operation where a mask image of a separate area state is set will be described below. FIG. 5 is an explanatory diagram illustrating a mask image settings screen which is displayed on monitor 4.

The mask image settings screen is a mask image of a separate area state (group and standalone) which is set by a user, and area state selection section 61, mask image selection section 62, set button 63, and set content display unit 64 are provided on the mask image settings screen.

In area state selection section 61, a user selects the area state (group and standalone) from a pull-down menu. In mask image selection section 62 a user selects a type of mask image which corresponds to the area state selected from a tile menu in area state selection section 61. In mask image selection section 62 a user selects the transparency of the mask image from a pull-down menu. It is possible to select the transparency in a range of 0 to 100%.

In area state selection section 61 and mask image selection section 62, the type and transparency of the mask image which corresponds to the area state (group and standalone) are selected, and when set button 63 is operated, the set content, that is, the mask image of the separate area state is displayed on set content display unit 64.

Figure 6:
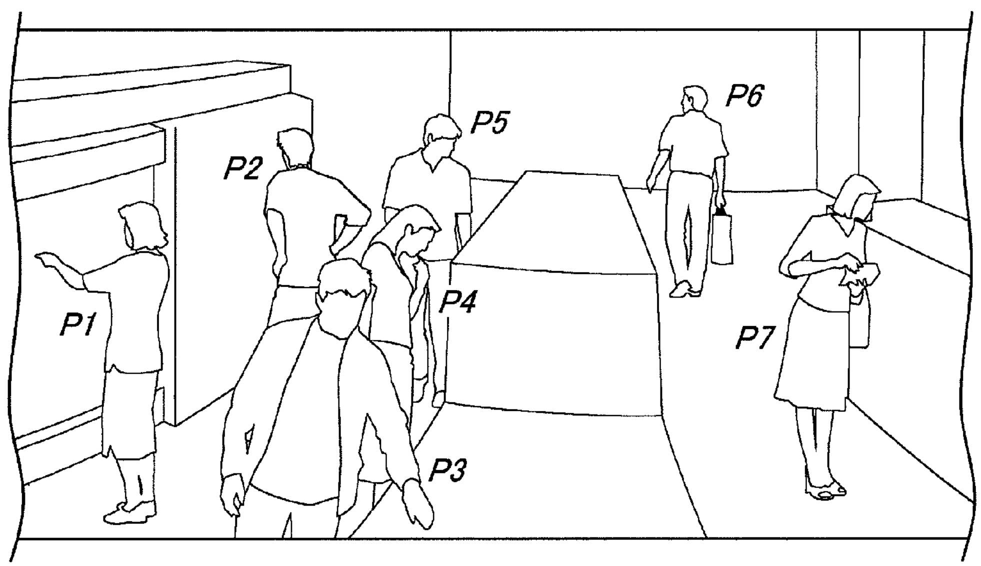
FIG. 6 is an explanatory diagram illustrating original moving images from before a person area is changed to the mask image.
Figure 7A:
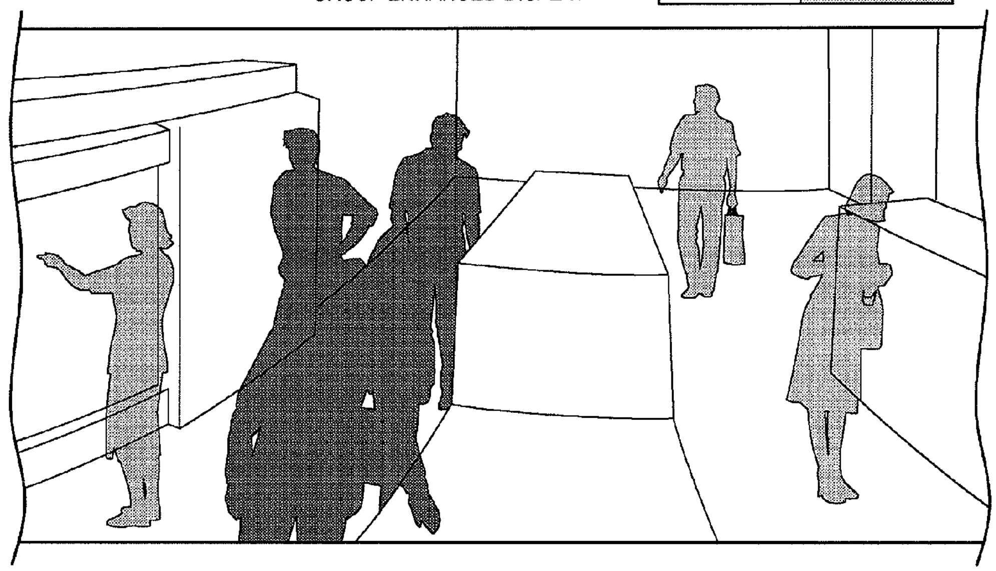
FIG. 7A is an explanatory diagram illustrating moving images where the person areas are changed to the mask images.
Figure 7B:
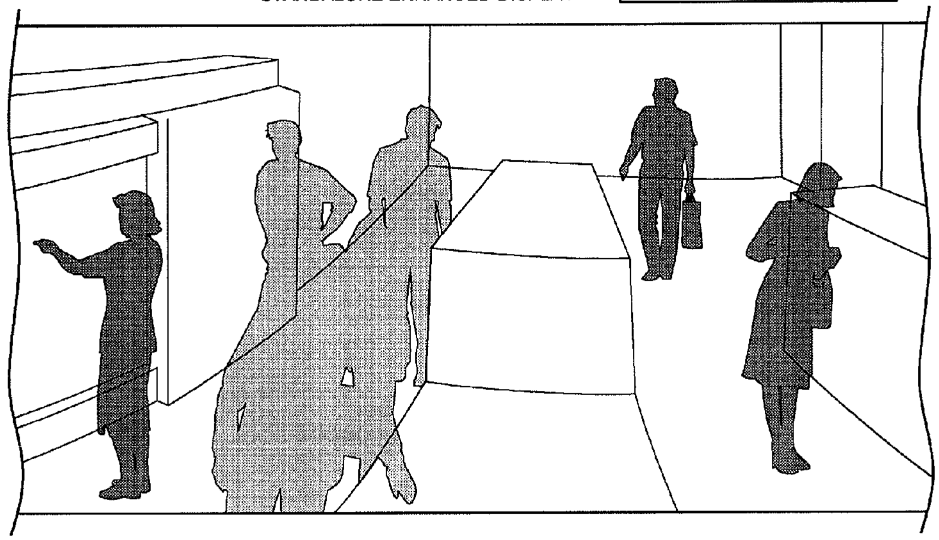
FIG. 7B is an explanatory diagram illustrating moving images where the person areas are changed to the mask images.

Moving images where the person area is changed to the mask image will be described below. FIG. 6 is an explanatory diagram illustrating source moving images from before a person area is changed to the mask image. FIGS. 7A and 7B are explanatory diagrams illustrating moving images where the person area is changed to the mask image. The moving images are generated by moving image output controller 34 and displayed on moving image display unit 48 of the monitoring screen which is shown in FIG. 4.

As shown in FIG. 6, a plurality of people P1 to P7 are imaged in the moving images captured by camera 1, and as shown in FIG. 7A and FIG. 7B, image areas of these people P1 to P7 are changed to mask images which correspond to the area state (group and standalone). Since the mask images are transparent, a state occurs where the background image appears transparent.

In the moving images, the person area in the captured moving images in FIG. 6 are replaced by mask images with separate area states. Since the people P2 to P5 are in a state of overlapping one another, the image areas of the people P2 to P5 are detected as one person area, and this person area is determined to be group which is configured by a plurality of people and is changed to a group mask image. The people P1, P6, and P7 are not in a state where the separate people overlap, the image areas of the people P1, P6, and P7 are each detected as separate person areas, and these person areas are determined to be standalone which each configured by one person and are changed to standalone mask images.

It is possible to enhance display of a specific area state which is observed, that is, at least one of group and standalone mask images by setting the type and transparency of the mask images as appropriate. FIG. 7A is an example where display of a group mask image is enhanced by having low transparency, and FIG. 7B is an example where display of standalone mask images is enhanced by having low transparency.

Since the standalone mask image has a person area which is configured by one person, and the shape of the person is formed, it is easy to ascertain the state and movement of the person, therefore as shown in FIG. 7B, in an application where the behavior of the person is ascertained, it may be set such that standalone display is enhanced. Since the group mask image has a person area which is configured by a plurality of people, and the shapes of all of the people are not formed, it becomes difficult to ascertain the state and movement of the people, but since the group mask image indicates an area where various customers are gathered, that is, where there is a great deal of customer focus on expensive goods, as shown in FIG. 7A, in an application where an area where customers are gathered is ascertained, it may be set such that group display is enhanced.

In the present embodiment, it is possible to select a normal playback mode in which moving images captured by camera 1 are displayed without change and a mask playback mode in which moving images where the person area is changed to the mask image are displayed is selected, and when the moving images are played back, icons for identifying the playback mode may be displayed so as to be superimposed on the moving images such that it is possible for the user to identify playback in either playback mode. It may be possible to identify the playback mode by, for example, performing display where the color of the display frames of the moving images in the mask playback mode are different to the color of the display frames of the moving images in the normal playback mode. In a case where a monitoring screen is displayed with an object other than an application for surveillance such as marketing analysis, in order to reliably protect customer privacy, it may be possible to playback only in the mask playback mode.

Figure 8A:
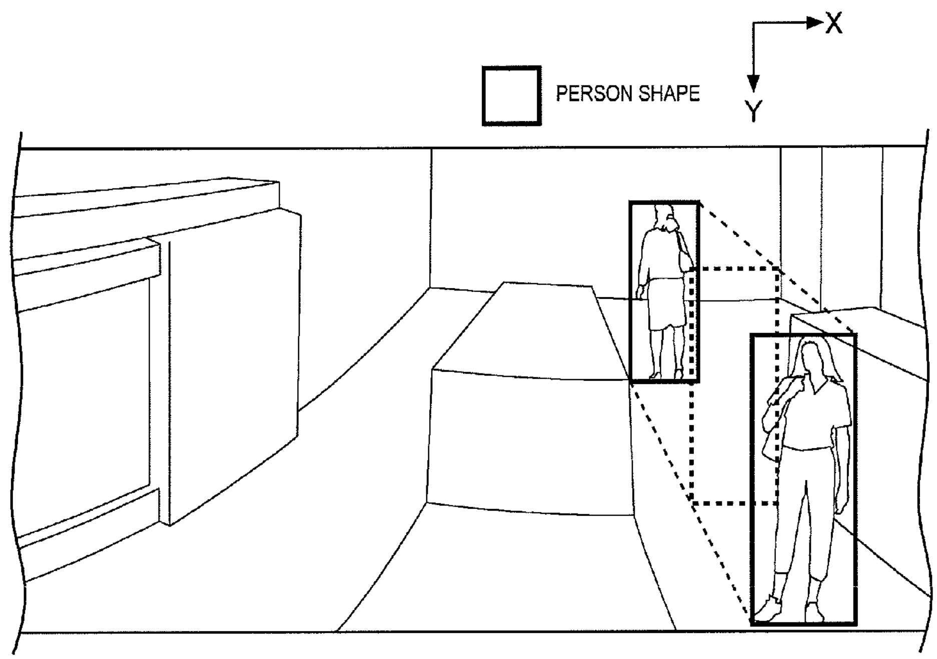
FIG. 8A is an explanatory diagram which illustrates the essence of area state determination which is performed using an area state determinator.
Figure 8B:
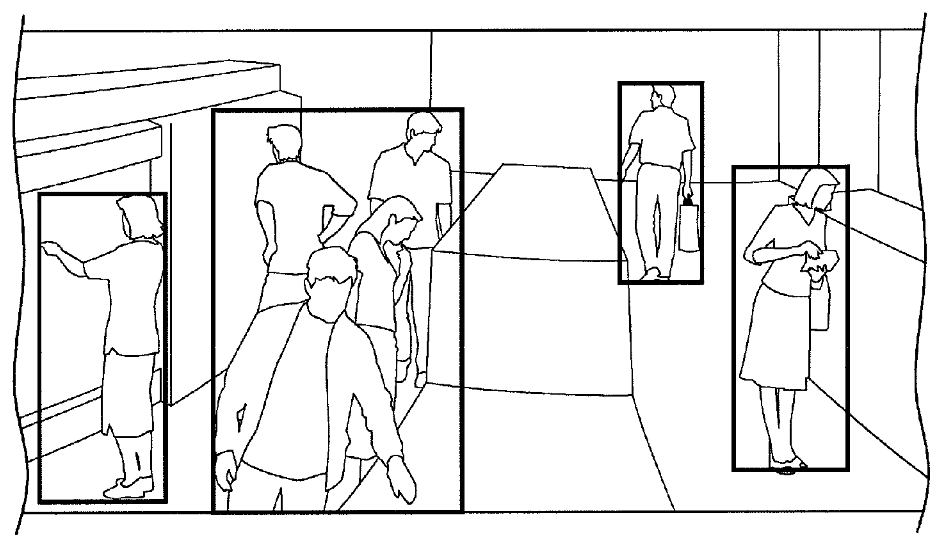
FIG. 8B is an explanatory diagram which illustrates the essence of area state determination which is performed using the area state determinator.

Area state determination which is performed using area state determinator 38 shown in FIG. 3 will be described below. FIG. 8A and FIG. 8B are explanatory diagrams which explain the essence of area state determination which is performed using area state determinator 38. In the present embodiment, area state determinator 38 determines whether there is either group which is configured by a plurality of people or standalone which is configured by one person as the area state. In the area state determination, it is determined whether the person area is either group or standalone based on surface area of the person area which is detected by person detector 37 from the moving images. A reference surface area is set which is equivalent to the surface area of the person area of one person, and the reference surface area is compared to the surface area of the person area which is detected from the moving images to determine whether the person area is either group or standalone.

Since camera 1 is arranged on the ceiling of the store and capture the inside of the store from diagonally above, people who are positioned at the front side viewed from camera 1 is imaged to be larger in the image area at the lower side in the captured moving images, people who are positioned at the back side viewed from camera 1 is imaged to be smaller in the image area at the upper side in the captured moving images, and the person area of one person is changed according to the position of in the Y direction (the up and down direction) above the moving images. For this reason, it is necessary to set the reference surface area according to the position in the Y direction above the moving images. In the present embodiment, reference surface area acquiring information (for example, refer to the tables, relational expression and the like) for determining the reference surface area is prepared in advance according to Y coordinate values, and the reference surface area is determined from the Y coordinate values based on the reference surface area acquiring information.

The reference surface area acquiring information is created based on a setting operation by a user which is performed in advance. As shown in FIG. 8A, an input screen is displayed on monitor 4, on the moving image which is displayed on the input screen, input device 6 such as a mouse is used and a person rectangle which encloses the person area of one person is input by a user. The person rectangle is input with regard to at least two people at positions which are largely shifted in the Y direction. The person rectangle is input with regard to people who are imaged at the front side and people who are imaged at the back side on the moving images. The surface area and the Y coordinate values of two person rectangles are used, and the reference surface area acquiring information for determining the reference surface area according to the Y coordinate values is set. The Y coordinate value may be, for example, a Y coordinate value of the center of the person rectangle.

As shown in FIG. 8B, when the area state is determined, a person rectangle, which surrounds the person area that is detected from the moving images, is acquired and the surface area of that person rectangle is determined. The Y coordinate value (for example, the Y coordinate value of the center of the person rectangle) of the person rectangle is acquired, and the reference surface area which corresponds to the Y coordinate value is acquired using the reference surface area acquiring information. The surface area of the person rectangle is compared to the reference surface area, and if the difference between the surface area of the person rectangle and the reference surface area is equal to or more than a predetermined threshold, the area state is determined as group, and if the difference between the surface area of the person rectangle and the reference surface area is less than the threshold, the area state is determined as standalone.

Figure 9A:
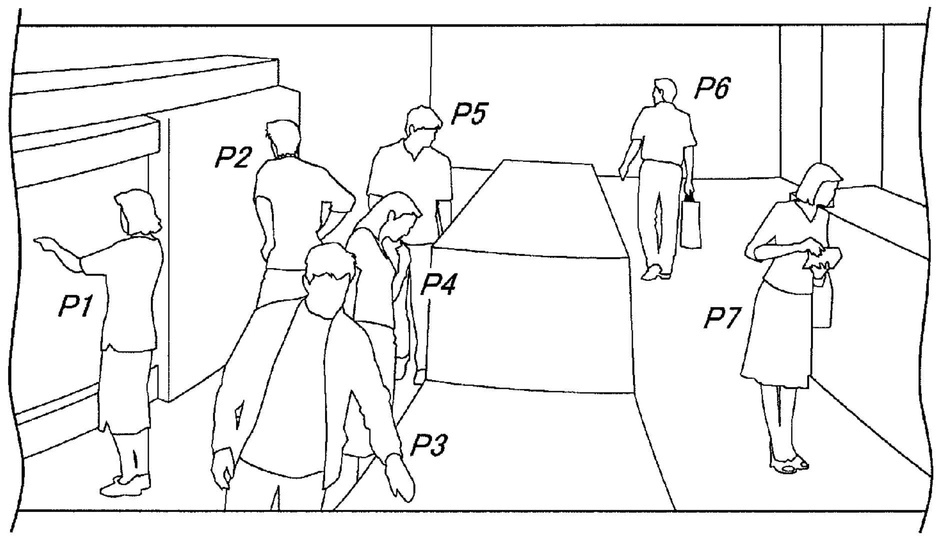
FIG. 9A is an explanatory diagram which illustrates moving images which are displayed in a group non-display mode.
Figure 9B:
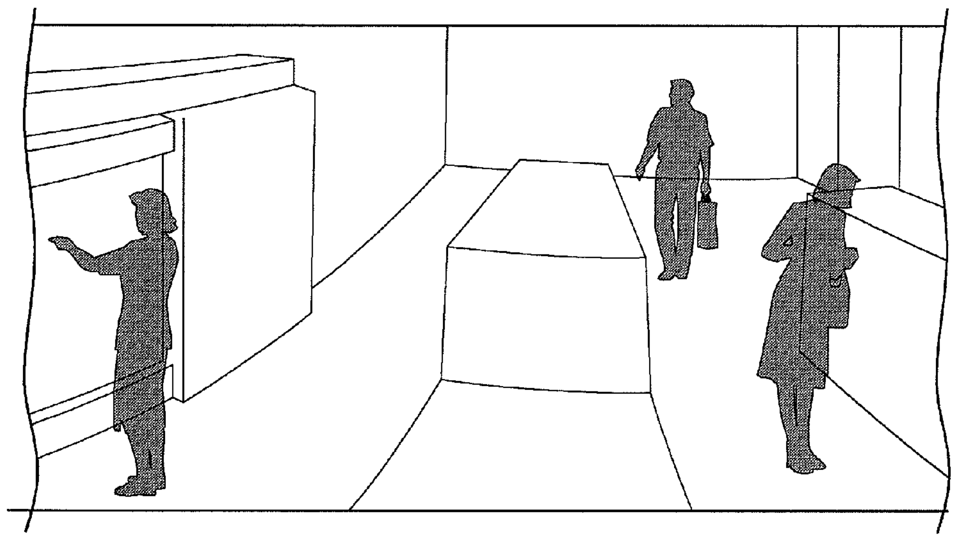
FIG. 9B is an explanatory diagram which illustrates moving images which are displayed in the group non-display mode.

A group non-display mode will be described below. FIG. 9A and FIG. 9B are explanatory diagrams which explain moving images which are displayed in a group non-display mode, source moving images are shown in FIG. 9A and moving images where the person area is changed to the mask image are shown in FIG. 9B. The moving images are generated by moving image output controller 34 and displayed on moving image display unit 48 of the monitoring screen which is shown in FIG. 8A and FIG. 8B.

As shown in FIG. 7A and FIG. 7B, in the normal playback mode the mask images are displayed in each person area of group and standalone, but since the group mask image is a person area which is configured by a plurality of people and the shape of all of the people are not formed and since it is not possible to easily ascertain the state and movement of the people, in an application where the behavior of the people is monitored, there are cases where the group mask image is wasted, and furthermore becomes a hindrance to the work.

In such a case, as shown in FIG. 9A and FIG. 9B, it is possible to select the group non-display mode where the group mask image is not displayed. In the group non-display mode, the person area where the area state is determined to be standalone is changed to the mask image and displayed, but the person area where the area state is determined to be group is not displayed on the moving image, and the mask image of only one type is used for standalone.

In this manner, according to the needs of the user, when the group mask image is set so as not to be displayed, it is possible to improve the work effectiveness when monitoring the behavior of people and it is possible to improve user convenience.

In the present embodiment, as shown in FIG. 5, it is possible to select the transparency of the mask image, and when the transparency is set to 100%, since the group mask image is in a state of not being displayed, the group mask image may be set to correspond to the transparency setting without particularly providing the group non-display mode.

In the first embodiment as above, positional information which relates to a person area is acquired by detecting people from captured moving images in person detector 37 of person image analyzer 32, the area state which indicates the state of people in the person area is determined in area state determinator 38 based on positional information, the mask image which corresponds to the area state is set in mask image setter 35, output moving images, where a person area is changed to a mask image which corresponds to the area state is generated and output in moving image output controller 34 based on the positional information and the area state which are output from person image analyzer 32, the mask image which corresponds to the area state which indicates the state of people in the person area is displayed, and since it is possible to easily ascertain the state of people in the person area using the mask image, it is possible for a user to effectively perform work where the behavior of people is ascertained from moving images and it is possible to reduce the burden on a user in a case where the moving images span a long period of time.

In the first embodiment, the area state is classified according to the number of people which the person area is configured by, and since it is possible to ascertain the number of people which the person area is configured by using the mask images which are displayed in the separate area states, it is possible to further effectively perform work where the behavior of people is ascertained from moving images.

In the first embodiment, in area state determinator 38, it is determined whether there is either group which is configured by a plurality of people or standalone which is configured by one person as the area state, the standalone mask image has a person area which is configured by one person and the shape of the person is formed, therefore, since it is easy to ascertain the state and movement of the person, it is possible to monitor behavior of the person in detail by observing the standalone mask image. Since the group mask image becomes a person area which is configured by a plurality of people and the shapes of all of the people are not formed, it becomes difficult to ascertain the state and movement of the people, but it is possible to ascertain an area where the people gather in the monitoring area by observing the group mask image, for example, in a store it is possible to ascertain an area where there is a great deal of customer focus on expensive goods.

In the first embodiment, the mask image which corresponds to the area state is set in mask image setter 35 according to an input operation of the user who selects the mask image which corresponds to the area state, and since it is possible for a user to freely set the mask image, it is possible to improve user convenience. Since it is possible to enhance display of a mask image in an area state which is observed according to the application by setting the mask image as appropriate, it is possible for a user to effectively perform work where the behavior of people or the state of the monitoring area is ascertained.

In the first embodiment, since the mask images are set such that the area state is identifiable by changing the display element of at least one of color, shade, pattern, and contour lines according to the area state, it is possible to easily identify the area state of the person area due to differences in the mask images.

In the first embodiment, in a case where the background image is generated by being updated from the captured moving images in background image generator 33, output moving images where the transparent mask image is superimposed on the background image are generated in moving image output controller 34 and the mask image is transparent, therefore, since the background image appears transparent, it is possible to monitor the behavior of people while viewing the circumstances of the monitoring area in which the background image is photographed.

In the first embodiment, since it is possible for a user to appropriately select the transparency in addition to the type of the mask image, it is possible to more appropriately enhance display of the mask image in the area state which is observed.

Second Exemplary Embodiment

A second embodiment will be described below. Points which are not specifically referenced are the same as the first embodiment.

Figure 10:
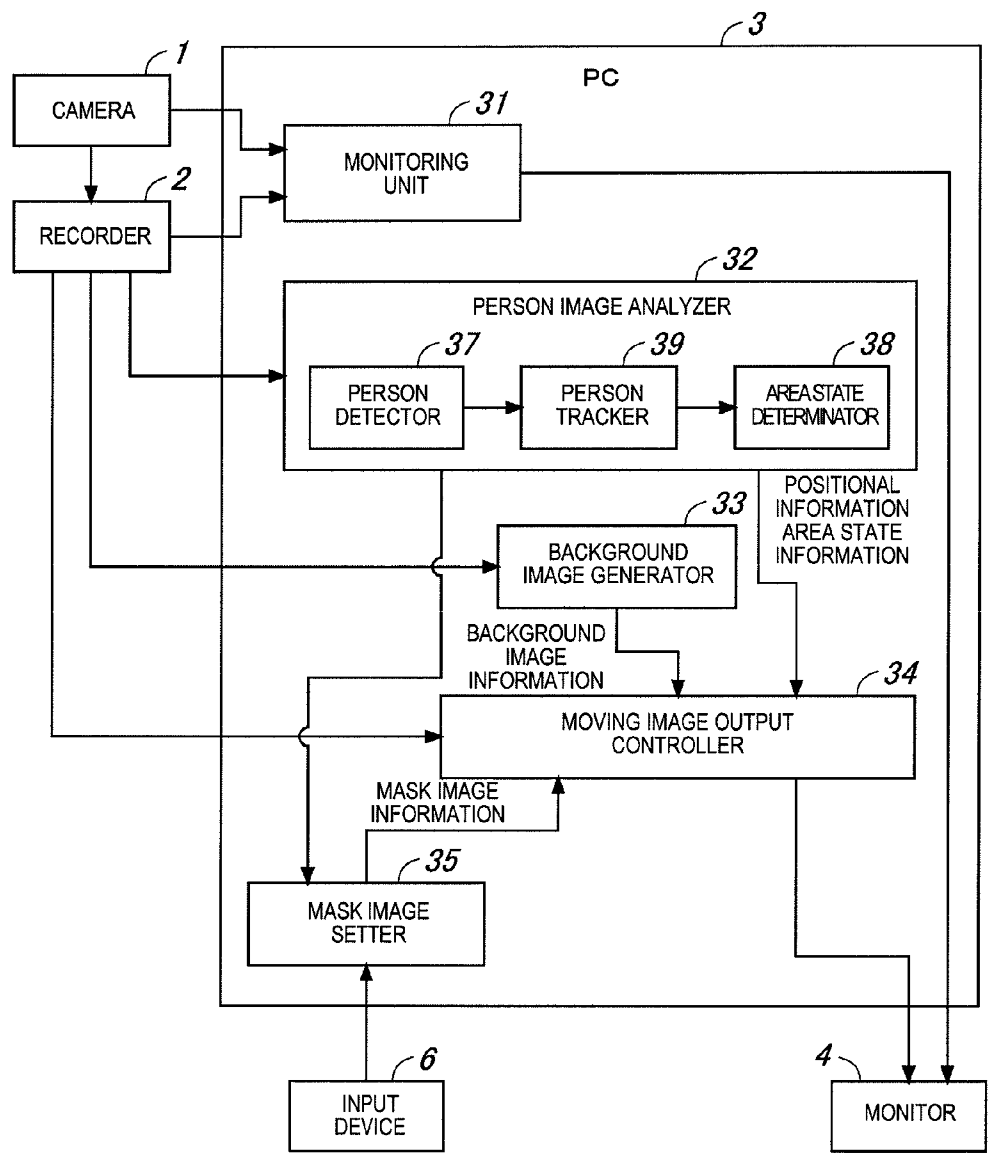
FIG. 10 is a functional block diagram illustrating a schematic configuration of the PC in a monitoring system according to a second embodiment.

FIG. 10 is a functional block diagram illustrating a schematic configuration of PC 3 in a monitoring system according to the second embodiment. In the second embodiment, person image analyzer 32 is provided with person tracker 39 in addition to person detector 37 and area state determinator 38.

Person detector 37 detects a person frame (a rectangle which encloses the upper half of the body of a person) in each frame of the captured moving images, and positional information of the person frame (information which relates to the position and the size of the person frame) is acquired. Person tracker 39 associates the positional information of the person frame which is acquired in person detector 37, that is, a process is performed where the positional information of the person frame is acquired in each frame (time) which relates to the same person. A process is performed in area state determinator 38 where the area state of the person area is determined based on positional information of person frames of each person who is acquired by person tracker 39.

Figure 11A:
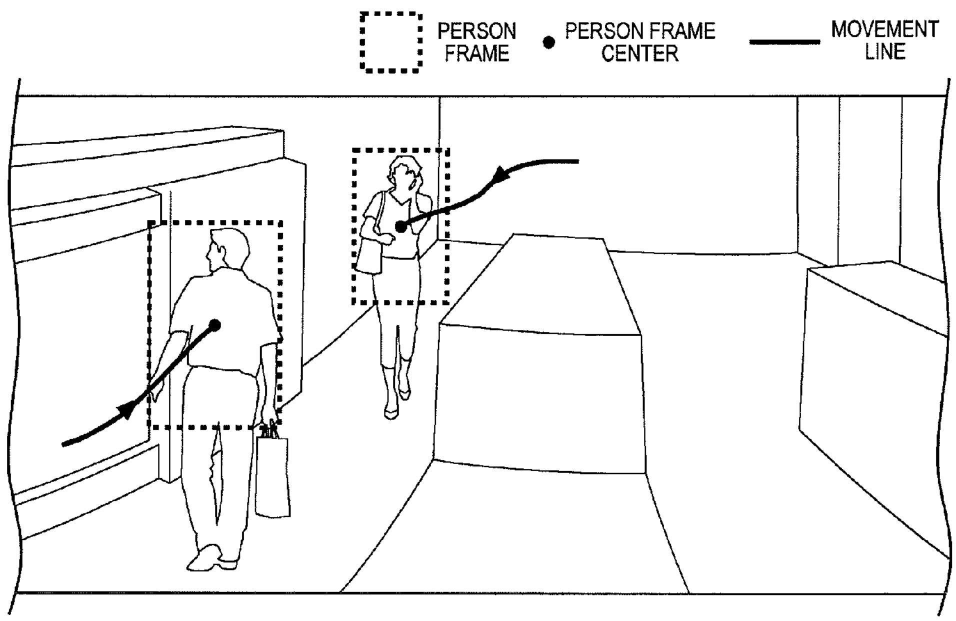
FIG. 11A is an explanatory diagram which illustrates the essence of area state determination which is performed using an area state determinator.
Figure 11B:
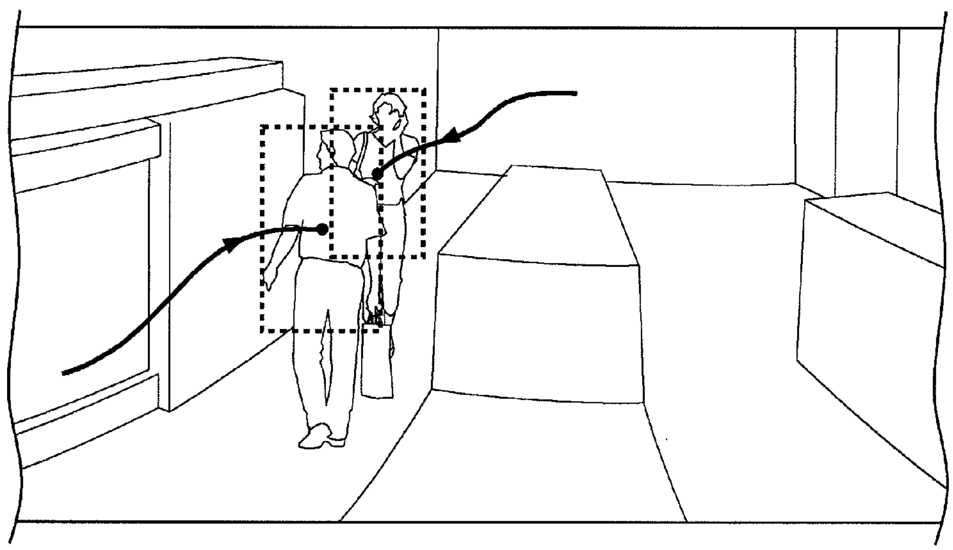
FIG. 11B is an explanatory diagram which illustrates the essence of area state determination which is performed using the area state determinator from FIG. 11A.

Area state determination which is performed using area state determinator 38 shown in FIG. 10 will be described below. FIG. 11A and FIG. 11B are explanatory diagrams which explain the essence of area state determination which is performed using area state determinator 38.

In the second embodiment, in the same manner as the first embodiment, a process is performed in area state determinator 38 where the person area is determined to be either group or standalone, but different to the first embodiment, in the second embodiment, the area state is determined based on the person tracker result using person tracker 39.

As shown in FIG. 11A, in a case where two people are separated and the person frame area (the area which is enclosed by the person frame) of each person who is detected from the moving images not overlap, the area state is determined as standalone. As shown in FIG. 11B, in a case where two people are close and the person frame areas overlap, the overlap ratio of the person frame areas (the proportion that person frame areas overlap with one another) is determined, the overlap ratio is compared with a predetermined threshold (for example 20%), if the overlap ratio is equal to or more than the threshold the area state is determined as group, and if the overlap ratio is less than the threshold the area state is determined as standalone.

In the state where a plurality of people overlap on the moving images, there are cases where the plurality of people cannot be detected one by one, in that case, since person detection fails and it is not possible to acquire the person frames, it is not possible to perform area state determination. In the present embodiment, area state determination is performed based on person tracker information which is acquired in person tracker 39.

In person tracker 39, in a case where positional information is acquired in each frame (time) for each person and person detection by frame fails in a state where the plurality of people overlap, the positional information in those frames is estimated from the positional information which is acquired in the plurality of frames directly before. Due to this, even in a state where a plurality of people overlap on the moving images, it is possible to reliably perform area state determination.

In the second embodiment, since positional information of a person frame is acquired for each person in person tracker 39 of person image analyzer 32, and the area state of the person area is determined in area state determinator 38 based on the positional information of a person frame which is acquired for each person by person tracker 39, it is possible to determine the area state of the person area with good precision.

Third Exemplary Embodiment

A third embodiment will be described below. Points which are not specifically referenced are the same as the first embodiment.

Figure 12:
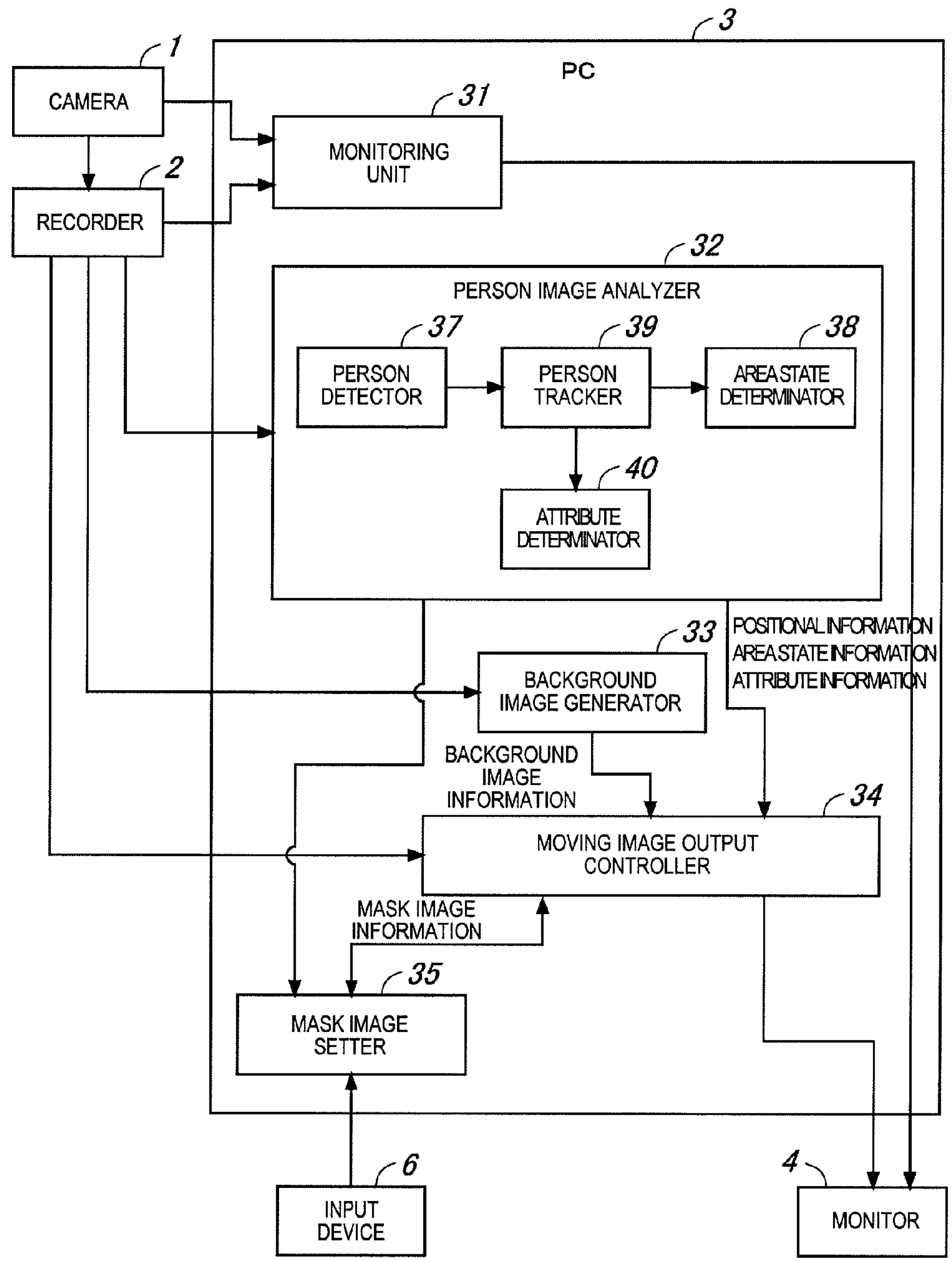
FIG. 12 is a functional block diagram illustrating a schematic configuration of the PC in a monitoring system according to a third embodiment.

FIG. 12 is a functional block diagram illustrating a schematic configuration of PC 3 in a monitoring system according to the third embodiment. In the third embodiment, in the same manner as the first embodiment, it is possible to display mask images with separate area states (group and standalone), furthermore, it is possible to display mask images with separate attributes (male and female), and person image analyzer 32 is provided with attribute determinator 40 in addition to person detector 37, person tracker 39, and area state determinator 38.

In attribute determinator 40, attributes are determined for each person who the person area is configured by, and the attributes of the entirety of the person area are determined based on the attributes of each person. The determination process for attributes of each person which is performed by attribute determinator 40 may use a known image recognition technique.

In a case where the area state is standalone, the attributes of each person who the person area is configured by are set as the attributes of the person area. In a case where the area state is group, the attributes of the entirety of the person area are determined from the attributes of each of the plurality of people who the person area is configured by. For example, the attributes of the entirety of the person area are determined from the proportion of people with the attribute. A group which is mainly configured by males is set as a male group, and the entirety of the person area is set as male, and a group which is mainly configured by females is set as a female group, and the entirety of the person area is set as female.

In the state where a plurality of people overlap on the moving images, there are cases where the plurality of people cannot be detected one by one, in that case, since person detection fails and it is not possible to acquire the attributes, it is not possible to perform attribute determination. In the present embodiment, attribute determination is performed based on person tracker information which is acquired in person tracker 39.

Positional information is acquired in each frame (time) for each person in person tracker 39, and attributes are determined for each person who is tracked by person tracker 39 in attribute determinator 40. In a case where person detection by frame in the state where a plurality of people overlap fails, in attribute determinator 40, people are specified who the person area is configured by where the plurality of people overlap and are determined to be group from positional information of each person directly before, and attributes of the entirety of the person area are determined from attributes of each person who the person area is configured by.

A process is performed in mask image setter 35 where mask images with separate area states and separate attributes are set according to a user input operation where mask images with separate area states and separate attributes are selected. Mask images with separate area states and with separate attributes may be set in advance.

A process is performed in moving image output controller 34 where output moving images where person areas which are changed to mask images with separate area states and separate attributes based on the positional information, the area state, and the attributes of each person which are output from person image analyzer 32, and in the output moving images, mask images of each person area are displayed such that the area state and attributes are identifiable on one background image.

In the third embodiment, the mask image is set such that the area state and the attributes are identifiable by changing the display element of at least one of color, shade, pattern, and contour lines according to the area state and the attributes, and in the same manner to the first embodiment, an inner section of the contour lines in the person area may be covered by a transparent image.

Figure 13:
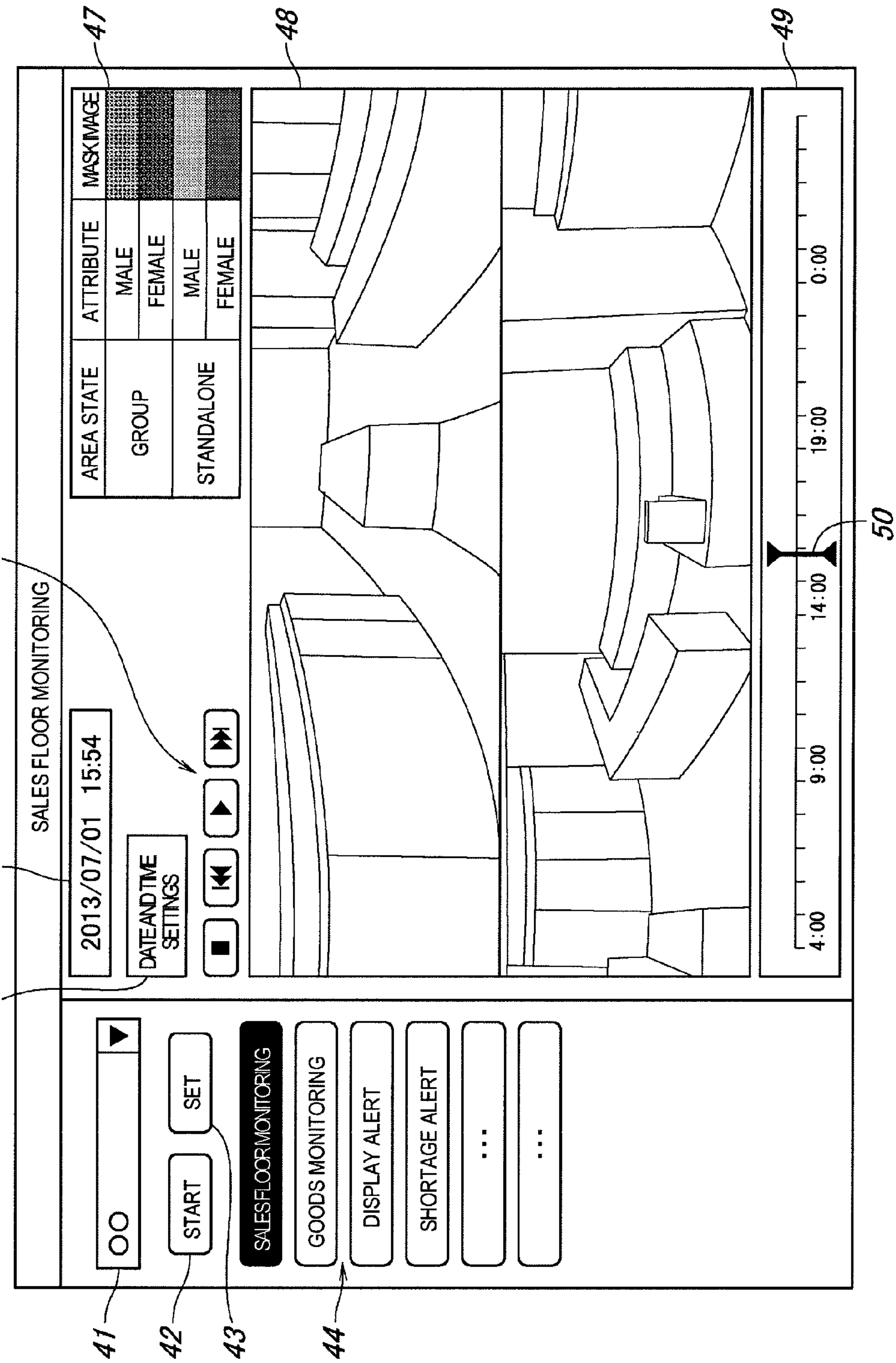
FIG. 13 is an explanatory diagram illustrating a monitoring screen which is displayed on the monitor.

A monitoring screen which is displayed on monitor 4 will be described below. FIG. 13 is an explanatory diagram illustrating the monitoring screen which is displayed on monitor 4.

Even in the third embodiment, the monitoring screen which is substantially the same as the first embodiment (refer to FIG. 4) is displayed on monitor 4, on the monitoring screen, the mask images which are set for each area state and attribute are displayed in legend display unit 47. The output moving images which are generated by moving image output controller 34, that is, moving images where the person area is changed to the mask images with separate area states and separate attributes are displayed on moving image display unit 48.

Figure 14:
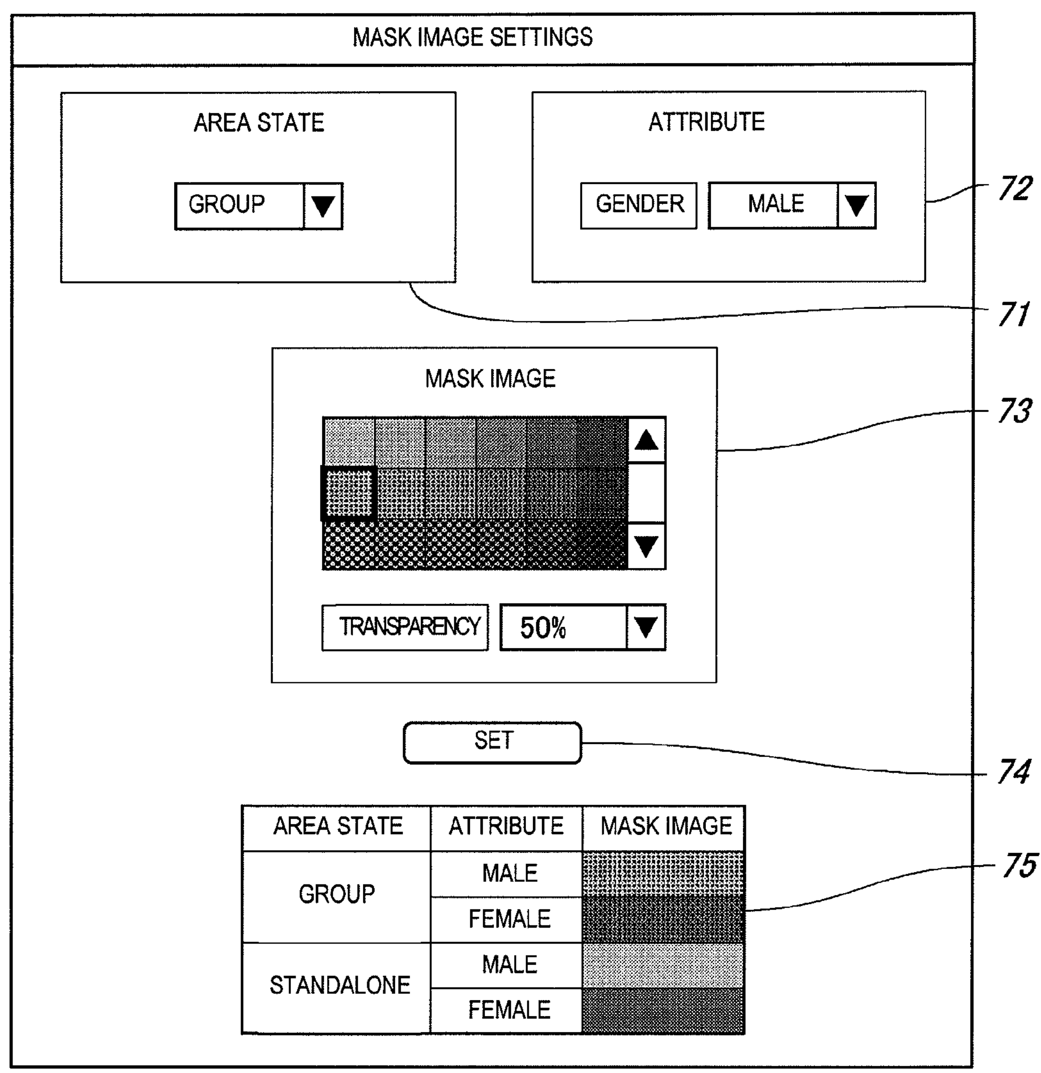
FIG. 14 is an explanatory diagram illustrating a mask image settings screen which is displayed on the monitor.

An operation where mask images with separate area states and with separate attributes are set will be described below. FIG. 14 is an explanatory diagram illustrating a mask image settings screen which is displayed on monitor 4.

The mask image settings screen is used for designating a mask image with separate area states and separate attributes by a user, and area state selection section 71, attribute selection section 72, mask image selection section 73, set button 74, and set content display unit 75 are provided on the mask image settings screen.

In area state selection section 71, a user selects the area state (group and standalone) from a pull-down menu. In attribute selection section 72, a user selects the attributes (gender) using a pull-down menu. In mask image selection section 73, a user selects mask images from a tile menu which correspond to an area state which is selected by area state selection section 71 and attributes which are selected by attribute selection section 72.

When the mask images which correspond to the area states and attributes in area state selection section 71, attribute selection section 72, and mask image selection section 73 are selected and set button 74 is operated, settings content, that is, mask images with separate area states and with separate attributes are displayed on set content display unit 75.

Figure 15A:
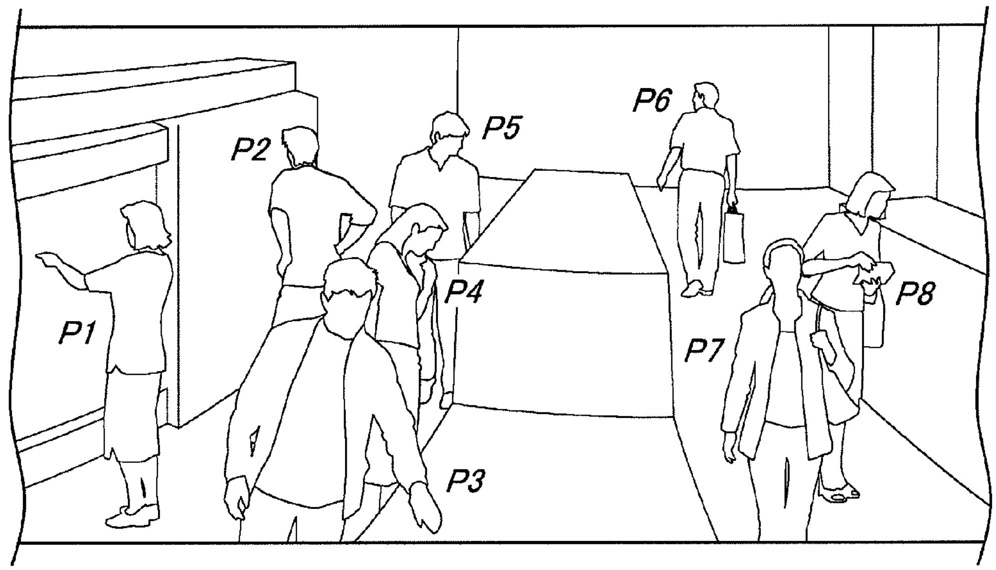
FIG. 15A is an explanatory diagram which illustrates moving images where the person areas are changed to the mask images.
Figure 15B:
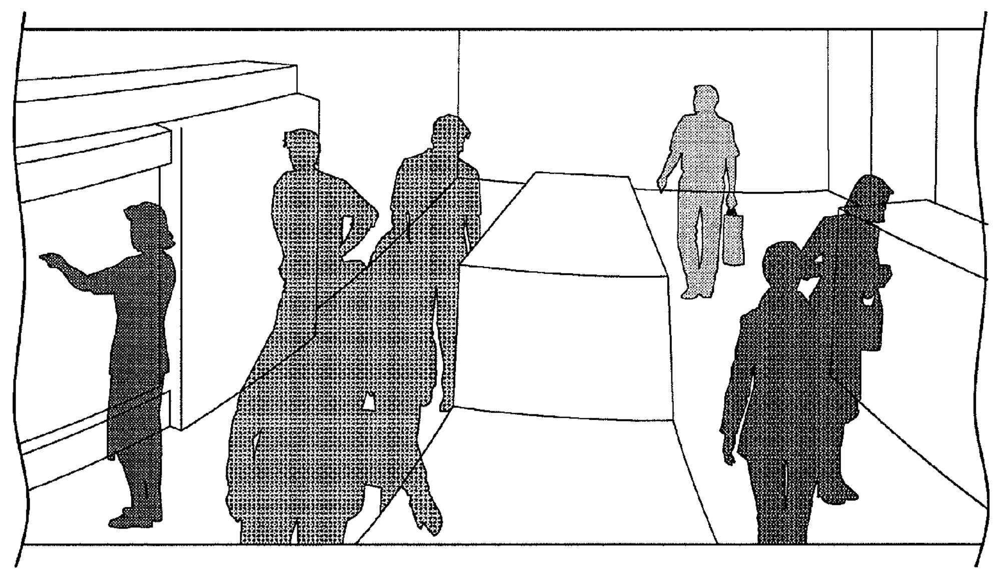
FIG. 15B is an explanatory diagram illustrating moving images where the person areas are changed to the mask images.

Moving images where the person area is changed to the mask image will be described below. FIG. 15A and FIG. 15B are explanatory diagrams which explain moving images where the person area is changed to the mask images, source moving images are shown in FIG. 15A and moving images where the person area is changed to the mask images are shown in FIG. 15B. The moving images are generated by moving image output controller 34 and displayed on moving image display unit 48 of the monitoring screen which is shown in FIG. 13.

In the third embodiment, in the same manner as the first embodiment (refer to FIG. 7A and FIG. 7B), output moving images where the person area is changed to the mask images are displayed, but particularly in the third embodiment, the person area is changed to mask images with separate area states (group and standalone) and with separate attributes (male and female).

As shown in FIG. 15A, with regard to the moving images, person areas which are configured by people P2 to P5 and person areas which are configured by people P7 and P8 are set as the person areas where the area state is group, since the person areas which are configured by people P2 to P5 are mainly configured by males, the attributes are determined to be male, and as shown in FIG. 15B, the person area is changed to group and male mask images. Since the person areas which are configured by people P7 and P8 are configured by only females, the attributes are determined to be female, and the person area is changed to group and female mask images.

In the third embodiment as above, attributes of the person area are determined in attribute determinator 40 of person image analyzer 32, mask images which correspond to the area state and the attributes are set in mask image setter 35, output moving images, where a person area is changed to mask images which correspond to the area state and attributes, are generated and output in moving image output controller 34, and separate mask images with separate attributes, for example male and female are displayed, therefore, since it is possible to easily ascertain attributes of the person area using mask images, it is possible for a user to effectively perform work where the behavior of people is ascertained for each attribute.

In the third embodiment, attributes are classified only as gender, but other attributes such as age (age group), ethnicity, classification as adult or child, profession (office lady or salary man) may be classified, furthermore, a plurality of types of attributes may be classified in combination. Mask images are set with main attributes (male or female) as attributes of group mask images, but in a case where a plurality of attributes which are included in group are equal, attributes may be determined to be mixed and separate mask images set.

Separate examples which relate to area states of the person area will be described below. FIGS. 16A, 16B, 17A, 17B, 18A, 18B, 19A, and 19B are explanatory diagrams which illustrate separate examples which relate to the area state of the person area, each A diagram indicates a source mask image and each B diagram indicates a moving image where the person area is changed to the mask image.

In embodiments 1 to 3, in area state determinator 38, either of group where the person area is configured by a plurality of people or standalone where the person area is configured by one person is determined as the area state, that is, the area state is classified by the number of people being determined as either one person or two people or more, but the number of people which is the classification reference may be changed.

Figure 16A:
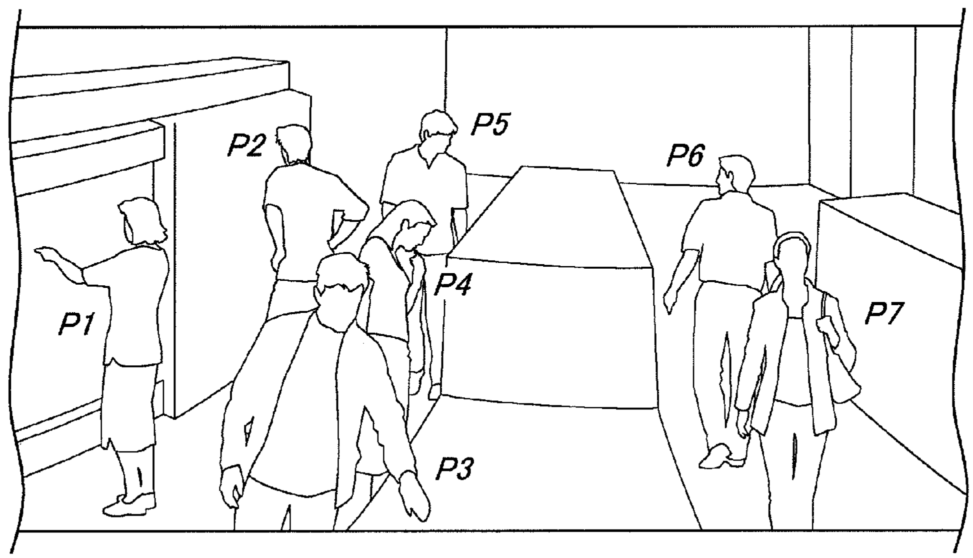
FIG. 16A is an explanatory diagram which illustrates a separate example which relates to the area states of the person areas.
Figure 16B:
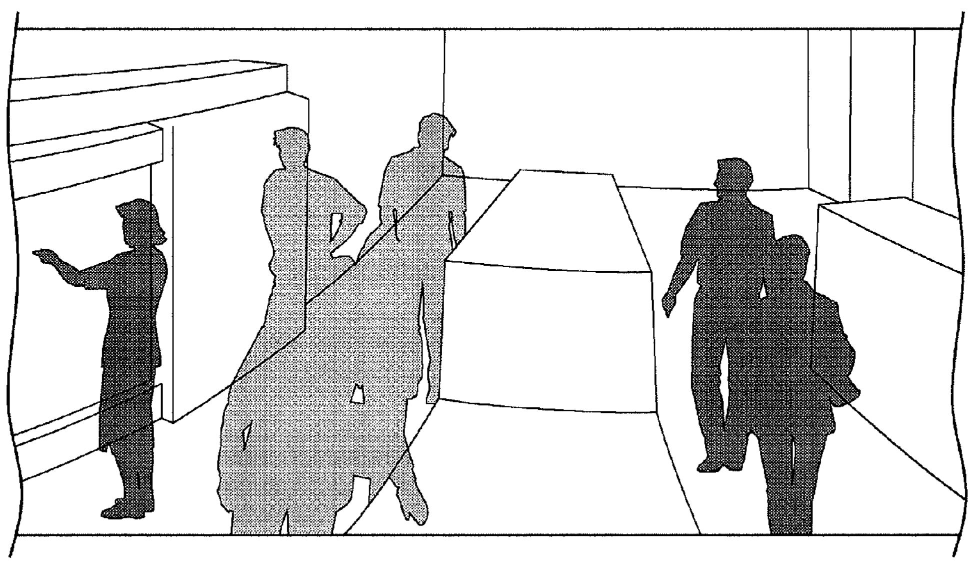
FIG. 16B is an explanatory diagram which illustrates a separate example which relates to the area states of the person areas.

FIG. 16A and FIG. 16B show examples where the number of people which is an area state classification reference is changed. In the examples, the area state is determined as group in a case where there are three or more people and the area state is determined as standalone in a case where there are two or less people. In this case, as shown in FIG. 8A and FIG. 8B, when the number of people which the person area is configured by is determined, area state determination may be performed by the reference surface area which is compared to the surface area of the person rectangle being set to a size which is equivalent to the area of the person area of two people.

As shown in FIGS. 16A and 16B, in the moving images, four people of people P2 to P5 overlap or two people of people P6 and P7 overlap. In the person area which is configured by four people of P2 to P5, the area state is determined as group and is changed to the group mask image, but in the person area which is configured by two people of P6 and P7, the area state is determined as standalone and is changed to the standalone mask image.

In the person area which is configured by two people, since it is possible to easily determine whether there are one or two people, it is possible to ascertain the state and the movement of the people to a certain extent. For this reason, in a case where display of the standalone mask image is enhanced in an application where the state and movement of people is ascertained, when the person area which is configured by two people is set to standalone as well as the person area which is configured by one person, it is possible to ascertain the state and movement of more people by more person mask images enhancing display.

In a case where two people pass one another, a phenomenon where two people overlap frequently occurs, when only a person area which is configured by one person is set to standalone, it becomes difficult to view the mask images which change frequently when the moving images are played back, but when a person area which is configured by two people is also set to standalone, it is possible to avoid the mask images changing frequently.

In the present embodiment, the area states of the person area are classified into two, but the area state of the person area may classify the area state of the person area into three or more according to the number of people that the person area is configured by.

Figure 17A:
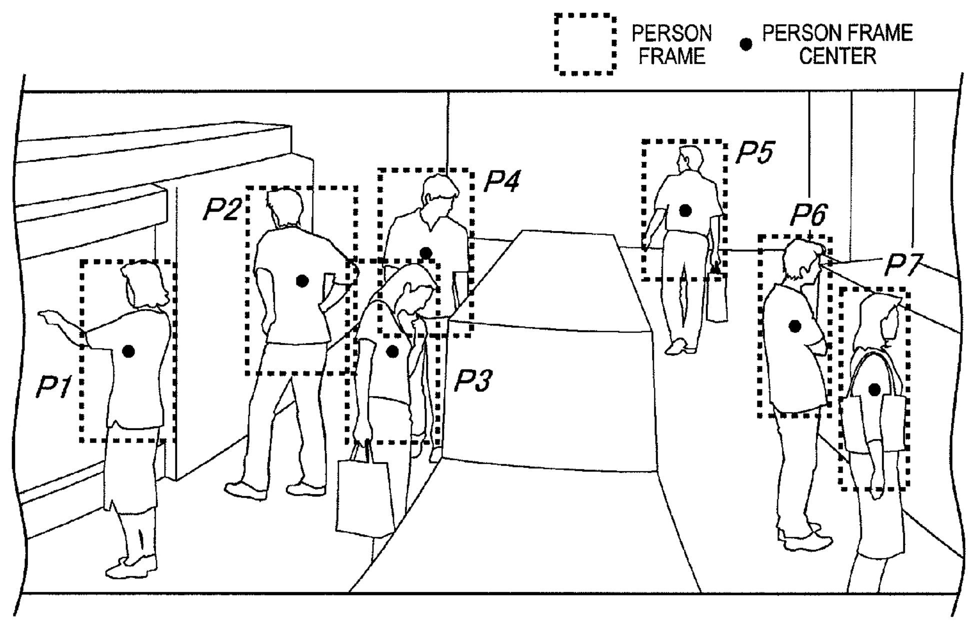
FIG. 17A is an explanatory diagram which illustrates a separate example which relates to the area states of the person areas.
Figure 17B:
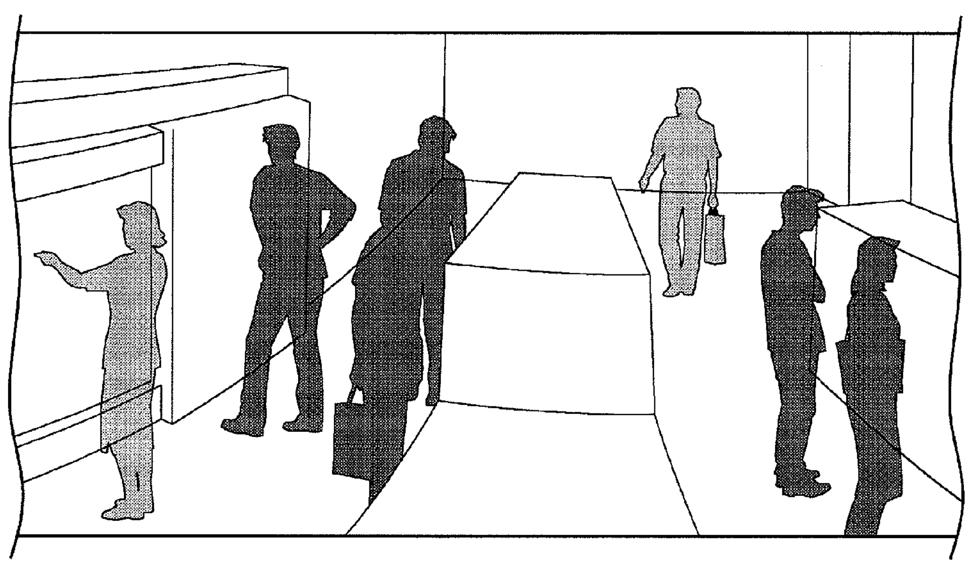
FIG. 17B is an explanatory diagram which illustrates a separate example which relates to the area states of the person areas.

FIG. 17A and FIG. 17B show examples where the area state is classified according to a distance between each person. In the example, group is determined in a case where the distance between people is small and standalone is determined in a case where the distance between people is large. That is, in the moving images, group is set in a case where one person area is configured by a plurality of people due to the person areas overlapping, and furthermore, even in the person area which is configured by one person, group is set in a case where a separate person is close by. Standalone is set in a case where there is no separate person close by.

As shown in FIGS. 17A and 17B, since one person area is configured by two people P3 and P4 overlapping, the person area is changed to the group mask image. The person P2 configures the person area independently, but since the separate people P3 and P4 are close by, the person area is changed to the group mask image. In the same manner, people P6 and P7 each configure the person area and are independent from one another, but since the people P6 and P7 are close to one another, the person area is changed to the group mask image. Since there are no separate people close to the people P1 and P5, the person area is changed to the standalone mask image.

When the area state is classified according to the distance between each of the people, it is possible to determine by eye a mixed state inside the store, that is, an area which is mixed and an area which is inactive.

In this case, the area state may be determined by the distance to the center of the person area. That is, a distance of people to one another is determined from the position of the person (the center position of the person frame), the distances of the people to one another are compared to a reference distance, group is determined if the distance of the people to one another is less than the predetermined reference distance, and standalone is determined if the distance of the people to one another is more than or equal to the predetermined reference distance. In this case, since the sizes of the one person areas are different according to the position on the moving images, the reference distance may be set according to the position on the moving images (for example, Y coordinate values).

Area states may be classified into three: a case where one person area is configured by people who overlap in the moving images such as P3 and P4 in FIG. 17A and FIG. 17B; a case where separate people are present close by such as people P2, P6, and P7 in FIG. 17A and FIG. 17B; and a case where separate people are not present close by such as people P1 and P5 in FIG. 17A and FIG. 17B. Due to this, it is possible ascertain the mixed state inside the store in more detail.

In each of the first to third embodiments and the separate examples, the area state is classified according to the number of people which the person area is configured by, but in addition to classifying the area state based on such a number, it is possible to classify the area state in various person states.

Figure 18A:
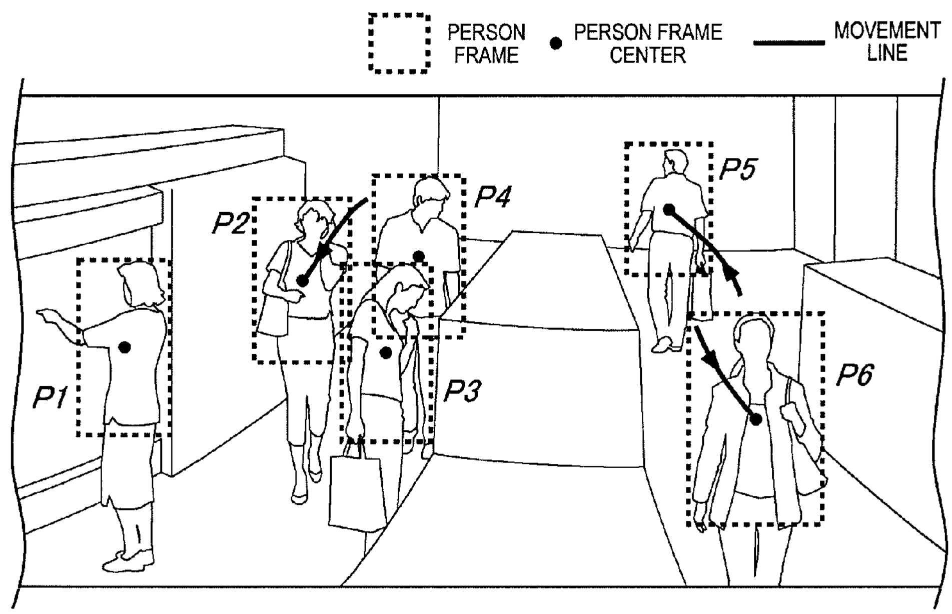
FIG. 18A is an explanatory diagram which illustrates a separate example which relates to the area states of the person areas.
Figure 18B:
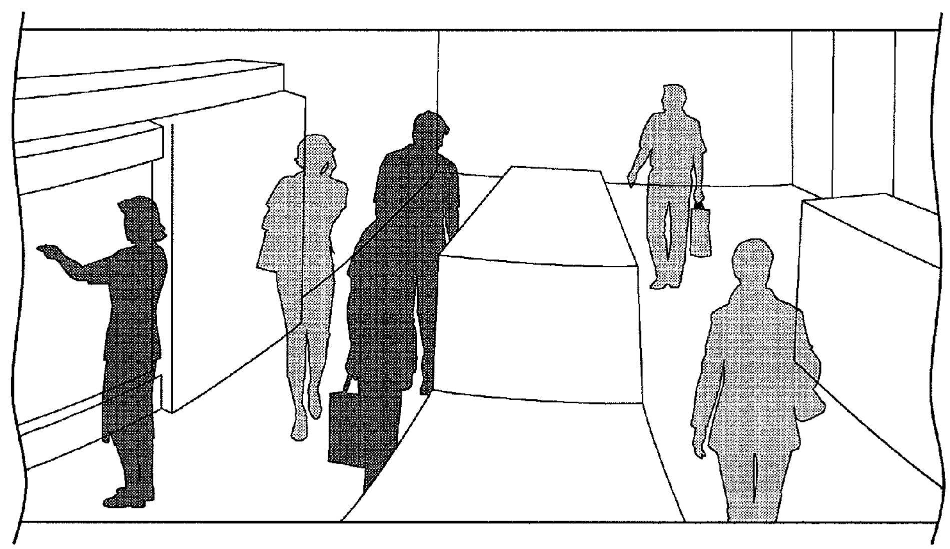
FIG. 18B is an explanatory diagram which illustrates a separate example which relates to the area states of the person areas.

FIG. 18A and FIG. 18B show examples where the area state is classified according to presence or absence of movement of each person. In the examples, different mask images are set according to the presence or absence of movement of people by setting the person area which is configured by people who are stationary or who barely move as an area state of "no movement" and setting the person area which is configured by people who are moving as an area state of "movement".

As shown in FIGS. 18A and 18B, since the people P1, P3, and P4 stop and stand before the display shelving to assess goods, the people are stationary or barely move, therefore the person area is determined as "no movement" and the person area is changed to "no movement" mask image. The people P2, P5, and P6 walk around looking for goods, and since the people go toward the register counter or the exit there is movement, therefore the area state is determined as "movement", and the area state is changed to "movement" mask image.

When the area state is classified according to presence or absence of movement of people, it is possible to determine by eye between people who are moving and people who are not moving due to the mask image. It is possible to easily identify an area where the movement of people is small and an area where the movement of people is great inside the store from the changed circumstances of the mask image when the moving images are played back.

In this case, a tracking result by person tracker 39, that is, presence or absence of movement of people may be determined based on positional information in each frame (time) for each person.

In the examples, two area states are classified by whether the people move, but the area states may be classified into three or more due to the extent of movement of people.

Figure 19A:
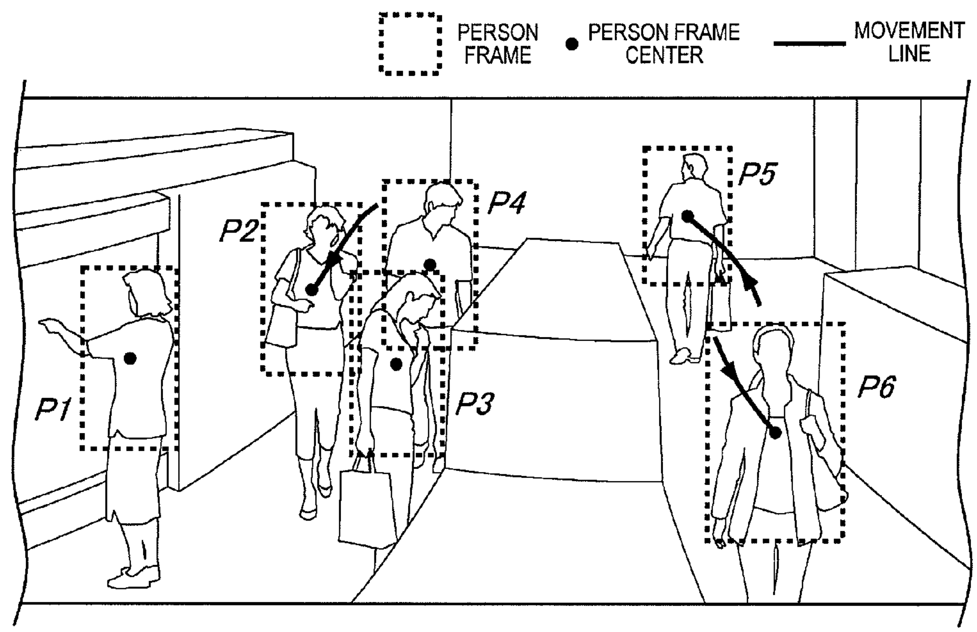
FIG. 19A is an explanatory diagram which illustrates a separate example which relates to the area states of the person areas.
Figure 19B:
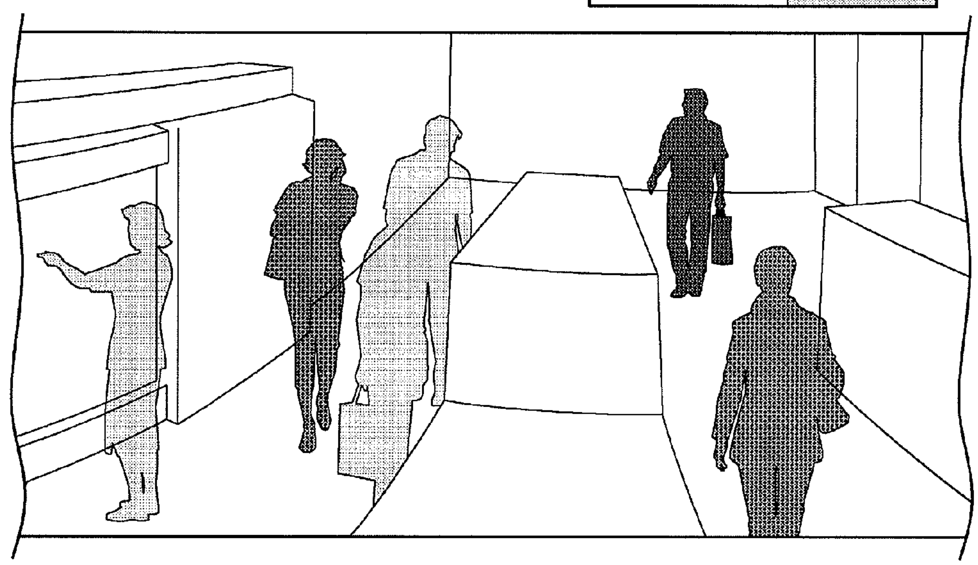
FIG. 19B is an explanatory diagram which illustrates a separate example which relates to the area states of the person areas.

FIG. 19A and FIG. 19B show examples where the area state is classified according to the movement direction of people. In the examples, out of the people who move, person areas which are configured by people who move from the front side to the back side viewed from camera 1 are set to an area state "movement to the back side", person areas which are configured by people who move from the back side to the front side are set to an area state "movement to the front side", and mask images are set which are different according to the movement direction of the people.

As shown in FIGS. 19A and 19B, since the person P5 moves from the front side to the back side, the area state is determined as "movement to the back side" and changed to the "movement to the back side" mask image. Since the people P2 and P6 move from the back side to the front side, the area state is determined as "movement to the front side" and changed to the "movement to the front side" mask image. Since the people P1, P3, and P4 are stationary, the area state is determined as "no movement" and changed to the "no movement" mask image.

When classifying the area state according to the movement direction of people, it is possible to determine the movement direction of people by eye using the mask image. It is possible to easily ascertain the flow of people inside the store from the changed circumstances of the mask images when the moving images are played back.

In this case, the movement direction may be determined based on the tracking result by person tracker 39, that is, positional information in each frame (time) for each person.

It is possible to classify the area state according to presence or absence of movement and the movement direction of the people, but in addition the area state may be classified according to the orientation of the faces of the people. It is possible to acquire the orientation of the faces of the people using a known person recognition technique, and when the area state is classified according to the orientation of the faces of the people, it is possible to ascertain the degree of customer focus or the like which with regard to goods using the mask images.

The present embodiment is described above based on specific embodiments, but the embodiments are only examples, and the present invention is not limited by these embodiments. Each configuring element of the monitoring device, monitoring system, and monitoring method according to the present invention which is shown in the embodiments above is not necessarily essential, and it is possible to select, as appropriate, at least limited to not departing from the range of the present invention.

For example, in each embodiment, an example of a retail store such as a convenience store is described, but the invention is not limited to such a retail store, and it is possible to apply the invention to a store with a business form other than a retail store. An application is possible where a monitoring area other than a store is set as a target.

In each of the embodiments, as shown in FIG. 2, camera 1 are set as omnidirectional camera which has a 360 degree capturing range using a fish-eye lens, but it is also possible to use a camera which has a predetermined angle of view, a so-called box camera.

In each of the embodiments, output moving images are generated where mask images for each person are superimposed on the background image, but a configuration is also possible where only the mask images are displayed and the background image is not displayed.

In each of the embodiments, necessary setting matter is input by selecting a pull-down menu or a tile menu, but the invention is not limited thereto, an appropriate input section may be provided on the screen, and a radio button or the like may be selected and it may be possible to directly input a number value.

In each of the embodiments, various configurations are shown which have respective characteristics, but these configurations are not limited to the combinations which are shown in each embodiment, and it is also possible to combine configurations which are shown separately in each embodiment, as appropriate.

In each of the embodiments, processes which are necessary for monitoring is carried out in PC 3 which is provided in a store, but as shown in FIG. 1, this necessary processes may be carried out in PC 11 which is provided at a head office or in cloud computer 21 which configures the cloud computing system. The necessary processes may be shared between a plurality of information processing devices and information may be delivered between the plurality of information processing devices via a communication medium such as an IP network or a LAN. In this case, the monitoring system is configured by the plurality of information processing devices which share the necessary processes.

In such a configuration, out of the necessary processes in monitoring, at least a process where a computation amount is great, for example a person detection process, may be performed in PC 3 which is provided in a store. When configuring in such a manner, since a data amount of information which is necessary in remaining processes can be reduced, even if remaining processes are carried out in an information processing device which is installed at a location which is different to a store, for example, PC 11 which is installed in a head office, since it is possible to reduce the communication load, operation of a system becomes easy using a wide-area network connection form.

Out of the necessary processes in monitoring, at least a process where a computation amount is great, for example a person detection process, may be performed in cloud computer 21. When configuring in such a manner, since the remaining processes require a small amount of computation, a high-speed information processing device at the user side such as a store is unnecessary and it is possible to reduce the cost which is a burden to the user.

All of the necessary processes may be performed on cloud computer 21, or alternatively, at least a moving image output control process out of the necessary processes may be shared with cloud computer 21, when configuring in this manner, aside from PC 3 and PC 11 which are provided in the store and the head office, it is possible to display the moving images even on a portable terminal such as smartphone 22 or tablet terminal 23, and thereby it is possible to confirm the circumstances inside the store at an arbitrary location such as an external destination other than the store or the head office.

In the present embodiment, along with carrying out processes necessary in monitoring in PC 3 which is installed in the store, necessary input and output is performed in PC 3 by displaying a monitoring screen or a mask image settings screen on monitor 4 of PC 3, but necessary input and output may be performed in a separate information processing device to the information processing device which carries out the necessary processes in monitoring, for example, in PC 11 which is installed at the head office or a portable terminal such as tablet terminal 23.

4K televisions and the like which pursue high image quality for monitors have been developed in recent years, it is possible to improve person identification performance by adopting a camera which corresponds to such a 4K television, and even in an environment where there are many people, it is possible for a user to easily ascertain the behavior of people from mask playback moving images.

The monitoring device, monitoring system, and monitoring method according to the present invention are useful as a monitoring device, a monitoring system, and a monitoring method where it is possible for a user to effectively perform work where the behavior of people is ascertained from moving images in a monitoring area, which have an effect whereby it is possible to reduce a burden on a user in a case where the moving images span a long period of time, and where output moving images, where a person area which is detected from captured moving images in a monitoring area is changed to a mask image, are generated and output.

What is claimed is:

1. A monitoring device which generates and outputs output moving images, where person areas which are detected from captured moving images in a monitoring area are changed to mask images, the device comprising:

a processor, and a memory which stores instructions, wherein a configuration when the processor executes the instructions which are stored in the memory, includes:

a person image analyzer which has a person detector which detects people from the captured moving images and acquires positional information which relates to the person areas, and an area state determinator which determines the area states which show the state of people in the person area based on the positional information;

a mask image setter which sets the mask image which corresponds to the area state; and a moving image output controller which generates and outputs the output moving images where person areas are changed to the mask images which correspond to the area state based on the positional information and the area states which are output from the person image analyzer.

2. The monitoring device of claim 1, wherein the area state is classified according to the number of people that the person area is configured by.

3. The monitoring device of claim 2, wherein the area state determinator determines either group which is configured by a plurality of people or standalone which is configured by one person as the area state.

4. The monitoring device of claim 1, wherein the mask image setter sets the mask image which corresponds to the area state according to an input operation by a user who selects the mask image which corresponds to the area state.

5. The monitoring device of claim 1, wherein the person image analyzer further has an attribute determinator which determines attributes of the person area, the mask image setter sets the mask image which corresponds to the area state and the attributes, and the moving image output controller generates and outputs the output moving images, where the person areas are changed to the mask images which correspond to the area state and the attributes.

6. The monitoring device of claim 1, wherein the mask image enables the area state to be identified by changing the display element of at least one of color, shade, pattern, and contour lines according to the area state.

7. The monitoring device of claim 1, further comprising:

a background image generator which generates a background image from the captured moving images, wherein the moving image output controller generates the output moving images where the mask image which has transparency is superimposed on the background image.

8. A monitoring system which generates and outputs output moving images obtained by changing person areas which are detected from captured moving images in a monitoring area to mask images, the system comprising:

a camera which captures a monitoring area; and a plurality of information processing devices, wherein any one of the plurality of information processing devices has a processor and a memory which stores instructions, and the processor, when executing the instructions which are stored in the memory, includes:

a person image analyzer which has a person detector which detects people from the captured moving images by the camera and acquires positional information which relates to the person areas, and an area state determinator which determines the area states which indicate the state of people in the person area based on the positional information;

a mask image setter which sets the mask image which corresponds to the area state; and a moving image output controller which generates and outputs the output moving images where person areas are changed to the mask images which correspond to the area state based on the positional information and the area states which are output from the person image analyzer.

9. A monitoring method which causes an information processing device to execute a process where output moving images, where a person area which is detected from captured moving images in a monitoring area is changed to a mask image, are generated and output, wherein a step when the processor of the information processing device executes instructions stored in a memory, includes:

a step of executing a process where a person is detected from the captured moving images and positional information which is related to the person area is acquired and a process where an area state which indicates the state of people in the person area is determined based on the positional information;

a step of setting the mask image which corresponds to the area state; and a step of generating and outputting the output moving images, where the person area is changed to the mask image which corresponds to the area state based on the positional information and the area state.

* * * * *